US010496441B2

(12) United States Patent
Ji et al.

(10) Patent No.: US 10,496,441 B2
(45) Date of Patent: Dec. 3, 2019

(54) METHOD FOR ASSOCIATING NS WITH VNF, APPARATUS, AND SYSTEM

(71) Applicant: Huawei Technologies Co., Ltd., Shenzhen (CN)

(72) Inventors: Li Ji, Shanghai (CN); Lan Zou, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 163 days.

(21) Appl. No.: 15/654,286

(22) Filed: Jul. 19, 2017

(65) Prior Publication Data

US 2017/0315844 A1 Nov. 2, 2017

Related U.S. Application Data

(63) Continuation of application No. PCT/CN2015/083809, filed on Jul. 10, 2015.

(30) Foreign Application Priority Data

Jan. 19, 2015 (WO) ................ PCT/CN2015/071007

(51) Int. Cl.
*G06F 9/46* (2006.01)
*G06F 9/50* (2006.01)
(Continued)

(52) U.S. Cl.
CPC ........ *G06F 9/5005* (2013.01); *G06F 9/45558* (2013.01); *G06F 9/50* (2013.01);
(Continued)

(58) Field of Classification Search
CPC ........ G06F 9/5005; G06F 9/4558; G06F 9/50; G06F 9/5077; G06F 2009/45595; H04L 29/02
See application file for complete search history.

(56) References Cited

U.S. PATENT DOCUMENTS 7,127,513 B2 * 10/2006 Karger .................. G06F 9/5027
709/226
9,760,428 B1 * 9/2017 Felstaine ............... H04L 41/022
(Continued)

FOREIGN PATENT DOCUMENTS

CN 104012066 A 8/2014
CN 104050045 A 9/2014
(Continued)

OTHER PUBLICATIONS

Machine Translation and Abstract of Chinese Publication No. CN104050045, Sep. 17, 2014, 29 pages.
(Continued)

Primary Examiner — Camquy Truong
(74) Attorney, Agent, or Firm — Conley Rose, P.C.

(57) ABSTRACT

A method for associating a network service (NS) with a virtualized network function (VNF), an apparatus, and a system such that a network manager (NM) can determine a relationship between an NS and a VNF, and maintain the NS. The method includes sending, by an NM, an NS instantiation request message to a network function virtualization orchestrator (NFVO), receiving an NS instantiation completion message from the NFVO, and determining a mapping relationship between a first NS and N VNFs according to information about the first NS and information about the N VNFs. The NS instantiation request message carries the information about the first NS, the NS instantiation completion message carries the information about the first NS and the information about the N VNFs, information about each VNF in the information about the N VNFs represents the VNF in the N VNFs forming the first NS, and N≥1.

10 Claims, 25 Drawing Sheets

(51) Int. Cl.
*H04L 29/02* (2006.01)
*G06F 9/455* (2018.01)

(52) U.S. Cl.
CPC ............ *G06F 9/5077* (2013.01); *H04L 29/02* (2013.01); *G06F 2009/45595* (2013.01)

(56) References Cited

U.S. PATENT DOCUMENTS

| | | |
|---|---|---|
| 2014/0201374 A1 | 7/2014 | Ashwood-Smith et al. |
| 2014/0229945 A1 | 8/2014 | Barkai et al. |
| 2014/0310707 A1 | 10/2014 | Rajan et al. |

FOREIGN PATENT DOCUMENTS

| | | | |
|---|---|---|---|
| CN | 104170323 | A | 11/2014 |
| CN | 104219127 | A | 12/2014 |
| CN | 104253866 | A | 12/2014 |
| EP | 3285439 | * | 12/2015 |
| EP | 3119034 | A1 | 1/2017 |
| WO | 2014169870 | A1 | 10/2014 |

OTHER PUBLICATIONS

Foreign Communication From a Counterpart Application, PCT Application No. PCT/CN2015/083809, English Translation of International Search Report dated Oct. 27, 2015, 2 pages.
Foreign Communication From a Counterpart Application, PCT Application No. PCT/CN2015/083809, English Translation of Written Opinion dated Oct. 27, 2015, 5 pages.
Machine Translation and Abstract of Chinese Publication No. CN104219127, Dec. 17, 2014, 46 pages.
Machine Translation and Abstract of Chinese Publication No. CN104253866, Dec. 31, 2014, 37 pages.
Machine Translation and Abstract of International Publication No. WO2014169870, Oct. 23, 2014, 28 pages.
Foreign Communication From A Counterpart Application, Chinese Application No. 201580001079.2, Chinese Office Action dated Aug. 3, 2018, 5 pages.

* cited by examiner

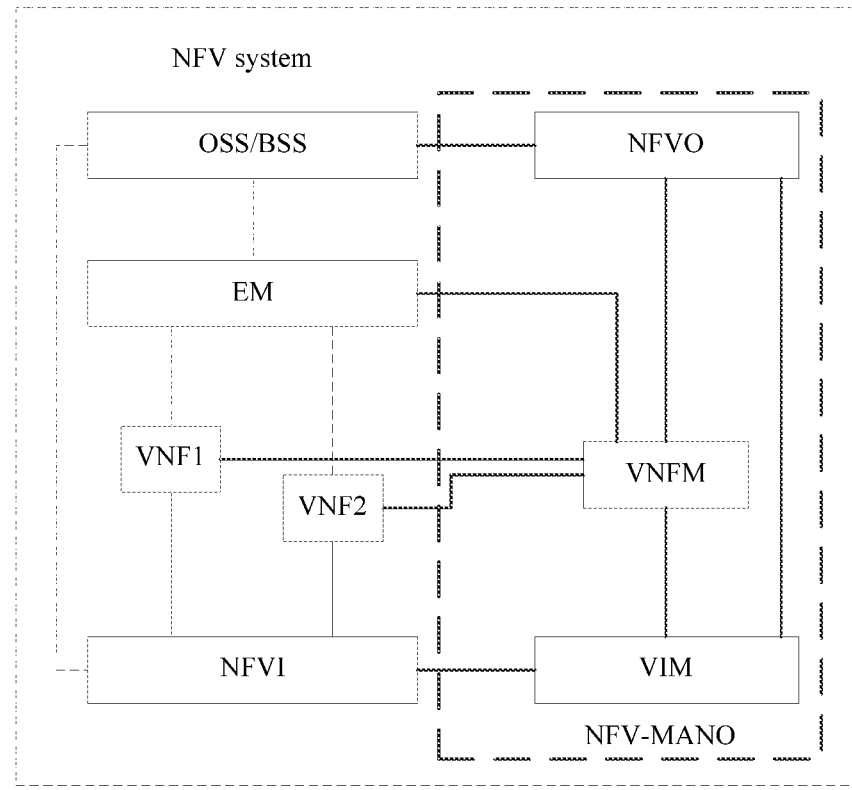

FIG. 1

| An NM sends an NS instantiation request message to an NFVO, where the NS instantiation request message carries information about a first NS, and the NS instantiation request message is used to request the NFVO to perform instantiation for the first NS | — S101 |

| The NM receives an NS instantiation completion message sent by the NFVO, where the NS instantiation completion message is used to indicate that instantiation for the first NS is completed, the NS instantiation completion message carries the information about the first NS and information about N VNFs, information about each VNF in the information about the N VNFs is used to represent the VNF in the N VNFs forming the first NS, and N≥1 | — S102 |

| The NM determines a mapping relationship between the first NS and the N VNFs according to the information about the first NS and the information about the N VNFs | — S103 |

FIG. 2

METHOD FOR ASSOCIATING NS WITH VNF, APPARATUS, AND SYSTEM

CROSS-REFERENCE TO RELATED APPLICATIONS

This application is a continuation of International Patent Application No. PCT/CN2015/083809 filed on Jul. 10, 2015, which claims priority to International Patent Application No. PCT/CN2015/071007 filed on Jan. 19, 2015. The disclosures of the aforementioned applications are hereby incorporated by reference in their entireties.

TECHNICAL FIELD

The present disclosure relates to the field of communications technologies, and in particular, to a method for associating a network service (NS) with a virtualized network function (VNF), an apparatus, and a system.

BACKGROUND

With rapid development of virtualization technologies, a network function virtualization (NFV) technology becomes more important. The NFV technology refers to instantiating (instantiate) a VNF such that the VNF can run on a general physical device to implement a function of a dedicated network element device in a network using the general physical device. For example, a serving gateway (SGW) function is instantiated such that the SGW function can run on the general physical device to implement the SGW function using the general physical device.

Generally, multiple VNFs can form an NS. In a procedure of instantiation for an NS, a network manager (NM) sends an NS instantiation request message to a NFV orchestrator (NFVO). The NS instantiation request message includes instantiation information of the NS. The NFVO may perform, according to the instantiation request message, a related connection operation on multiple VNFs satisfying the instantiation information of the NS such that the multiple VNFs form the NS. In this way, instantiation for the NS is completed.

However, in the foregoing procedure of instantiation for an NS, the NM can learn only instantiation information of an NS, but cannot learn multiple VNFs forming the NS. Consequently, when the NM needs to maintain an NS, because the NM cannot determine multiple VNFs forming the NS, the NM cannot maintain the NS.

SUMMARY

The present disclosure provides a method for associating an NS with a VNF, an apparatus, and a system such that an NM can determine a relationship between an NS and a VNF, and maintain the NS.

To achieve the foregoing objective, the following technical solutions are used in the present disclosure.

According to a first aspect, the present disclosure provides a method for associating an NS with a VNF, including sending, by an NM, an NS instantiation request message to an NFVO, where the NS instantiation request message carries information about a first NS, and the NS instantiation request message is used to request the NFVO to perform instantiation for the first NS, receiving, by the NM, an NS instantiation completion message sent by the NFVO, where the NS instantiation completion message is used to indicate that instantiation for the first NS is completed, the NS instantiation completion message carries the information about the first NS and information about N VNFs, information about each VNF in the information about the N VNFs is used to represent the VNF in the N VNFs forming the first NS, and N≥1, and determining, by the NM, a mapping relationship between the first NS and the N VNFs according to the information about the first NS and the information about the N VNFs.

In a first possible implementation manner of the first aspect, the information about each VNF includes at least one of an Internet Protocol (IP) address of the VNF represented by the information about the VNF or a first identifier of the VNF, where the IP address of the VNF is used to uniquely represent the VNF, and the first identifier of the VNF is used to uniquely represent the VNF.

With reference to the first possible implementation manner of the first aspect, in a second possible implementation manner, the first identifier of the VNF includes at least an identifier of the VNF.

With reference to the second possible implementation manner of the first aspect, in a third possible implementation manner, the first identifier of the VNF further includes an identifier of a VNF manager (VNFM), or the identifier of the VNFM and an identifier of the NFVO, where the VNFM is connected to the VNF.

With reference to the second possible implementation manner of the first aspect or the third possible implementation manner of the first aspect, in a fourth possible implementation manner, the identifier of the VNF is allocated to the VNF by the NFVO, the NM, an element manager (EM), or the VNFM connected to the VNF.

With reference to any one of the first possible implementation manner of the first aspect to the fourth possible implementation manner of the first aspect, in a fifth possible implementation manner, the IP address of the VNF is allocated to the VNF by the NFVO, the NM, the EM, or the VNFM connected to the VNF.

With reference to the first aspect or any one of the first possible implementation manner of the first aspect to the fifth possible implementation manner of the first aspect, in a sixth possible implementation manner, the information about the first NS includes instantiation information of the first NS, and determining, by the NM, a mapping relationship between the first NS and the N VNFs according to the information about the first NS and the information about the N VNFs includes determining, by the NM, the mapping relationship between the first NS and the N VNFs according to the instantiation information of the first NS and the information about the N VNFs.

With reference to the first aspect or any one of the first possible implementation manner of the fifth aspect to the fifth possible implementation of the first aspect, in a seventh possible implementation manner, the information about the first NS includes instantiation information of the first NS and an identifier of the first NS, and determining, by the NM, a mapping relationship between the first NS and the N VNFs according to the information about the first NS and the information about the N VNFs includes determining, by the NM, the mapping relationship between the first NS and the N VNFs according to the identifier of the first NS and the information about the N VNFs, or determining, by the NM, the mapping relationship between the first NS and the N VNFs according to the instantiation information of the first NS, the identifier of the first NS, and the information about the N VNFs.

With reference to the seventh possible implementation manner of the first aspect, in an eighth possible implementation manner, before sending, by an NM, an NS instantiation request message to an NFVO, the method further includes allocating, by the NM, the identifier of the first NS to the first NS.

With reference to the first aspect or any one of the first possible implementation manner of the first aspect to the fifth possible implementation manner of the first aspect, in a ninth possible implementation manner, the information about the first NS includes instantiation information of the first NS, and determining, by the NM, a mapping relationship between the first NS and the N VNFs according to the information about the first NS and the information about the N VNFs includes allocating, by the NM, an identifier of the first NS to the first NS according to the instantiation information of the first NS, and determining, by the NM, the mapping relationship between the first NS and the N VNFs according to the identifier of the first NS and the information about the N VNFs, or determining, by the NM, the mapping relationship between the first NS and the N VNFs according to the instantiation information of the first NS, the identifier of the first NS, and the information about the N VNFs.

According to a second aspect, the present disclosure provides a method for associating an NS with a VNF, including receiving, by an NFVO, an NS instantiation request message sent by an NM, where the NS instantiation request message carries information about a first NS, and the NS instantiation request message is used to request the NFVO to perform instantiation for the first NS, obtaining, by the NFVO according to the information about the first NS, information about N VNFs forming the first NS, where information about each VNF in the information about the N VNFs is used to represent the VNF in the N VNFs, and N≥1, and sending, by the NFVO, an NS instantiation completion message to the NM, where the NS instantiation completion message is used to indicate that instantiation for the first NS is completed, the NS instantiation completion message carries the information about the first NS and the information about the N VNFs, and the information about the first NS and the information about the N VNFs are used by the NM to determine a mapping relationship between the first NS and the N VNFs.

In a first possible implementation manner of the second aspect, the information about the first NS includes instantiation information of the first NS, where the instantiation information of the first NS includes instantiation information of the N VNFs, and obtaining, by the NFVO according to the information about the first NS, information about N VNFs forming the first NS includes sending, by the NFVO, a search indication message to a VNFM, where the search indication message carries the instantiation information of the first NS, and the search indication message is used to instruct the VNFM to search for the N VNFs according to the instantiation information of the first NS, receiving, by the NFVO, a search response message that is sent by the VNFM and that corresponds to the search indication message, where the search response message is used to determine an instantiation completed VNF and an instantiation uncompleted VNF in the N VNFs, and obtaining, by the NFVO, information about the instantiation completed VNF in the N VNFs and information about the instantiation uncompleted VNF in the N VNFs according to the search response message.

With reference to the first possible implementation manner of the second aspect, in a second possible implementation manner, obtaining, by the NFVO, information about the instantiation completed VNF in the N VNFs according to the search response message includes obtaining, by the NFVO according to the search response message, the information about the instantiation completed VNF in the N VNFs from VNF information saved in the NFVO, or obtaining, by the NFVO, the information about the instantiation completed VNF in the N VNFs from the search response message.

With reference to the first possible implementation manner of the second aspect, in a third possible implementation manner, obtaining, by the NFVO, information about the instantiation uncompleted VNF in the N VNFs according to the search response message includes sending, by the NFVO, at least one VNF instantiation request message to the VNFM according to the search response message, where the at least one VNF instantiation request message is used to request the VNFM to instantiate the instantiation uncompleted VNF in the N VNFs, and receiving, by the NFVO, at least one VNF instantiation completion message that is sent by the VNFM and that corresponds to the at least one VNF instantiation request message, where the at least one VNF instantiation completion message carries the information about the instantiation uncompleted VNF in the N VNFs.

With reference to any one of the first possible implementation manner of the second aspect to the third possible implementation manner of the second aspect, in a fourth possible implementation manner, the information about each VNF includes at least one of an IP address of the VNF represented by the information about the VNF or a first identifier of the VNF, where the IP address of the VNF is used to uniquely represent the VNF, and the first identifier of the VNF is used to uniquely represent the VNF.

With reference to the fourth possible implementation manner of the second aspect, in a fifth possible implementation manner, the first identifier of the VNF includes at least an identifier of the VNF.

With reference to the fifth possible implementation manner of the second aspect, in a sixth possible implementation manner, the first identifier of the VNF further includes an identifier of the VNFM, or the identifier of the VNFM and an identifier of the NFVO, where the VNFM is connected to the VNF.

With reference to the fifth possible implementation manner of the second aspect or the sixth possible implementation manner of the second aspect, in a seventh possible implementation manner, the identifier of the VNF is allocated to the VNF by the NFVO, the NM, an EM, or the VNFM connected to the VNF.

With reference to any one of the fourth possible implementation manner of the second aspect to the seventh possible implementation manner of the second aspect, in an eighth possible implementation manner, the IP address of the VNF is allocated to the VNF by the NFVO, the NM, the EM, or the VNFM connected to the VNF.

According to a third aspect, the present disclosure provides an NM, including a sending unit configured to send an NS instantiation request message to an NFVO, where the NS instantiation request message carries information about a first NS, and the NS instantiation request message is used to request the NFVO to perform instantiation for the first NS, a receiving unit configured to receive an NS instantiation completion message sent by the NFVO, where the NS instantiation completion message is used to indicate that instantiation for the first NS is completed, the NS instantiation completion message carries the information about the first NS and information about N VNFs, information about each VNF in the information about the N VNFs is used to represent the VNF in the N VNFs forming the first NS, and N≥1, and a determining unit configured to determine a mapping relationship between the first NS and the N VNFs according to the information about the first NS and the information about the N VNFs that are received by the receiving unit.

In a first possible implementation manner of the third aspect, the information about each VNF received by the receiving unit includes at least one of an IP address of the VNF represented by the information about the VNF or a first identifier of the VNF, where the IP address of the VNF is used to uniquely represent the VNF, and the first identifier of the VNF is used to uniquely represent the VNF.

With reference to the first possible implementation manner of the third aspect, in a second possible implementation manner, the first identifier of the VNF received by the receiving unit includes at least an identifier of the VNF.

With reference to the second possible implementation manner of the third aspect, in a third possible implementation manner, the first identifier of the VNF received by the receiving unit further includes an identifier of a VNFM, or the identifier of the VNFM connected to the VNF and an identifier of the NFVO.

With reference to the second possible implementation manner of the third aspect or the third possible implementation manner of the third aspect, in a fourth possible implementation manner, the identifier of the VNF received by the receiving unit is allocated to the VNF by the NFVO, the NM, an EM, or the VNFM connected to the VNF.

With reference to any one of the first possible implementation manner of the third aspect to the fourth possible implementation manner of the third aspect, in a fifth possible implementation manner, the IP address of the VNF received by the receiving unit is allocated to the VNF by the NFVO, the NM, the EM, or the VNFM, where the VNFM is connected to the VNF.

With reference to the third aspect or any one of the first possible implementation manner of the third aspect to the fifth possible implementation manner of the third aspect, in a sixth possible implementation manner, the information about the first NS received by the receiving unit includes instantiation information of the first NS, and the determining unit is further configured to determine the mapping relationship between the first NS and the N VNFs according to the instantiation information of the first NS and the information about the N VNFs.

With reference to the third aspect or any one of the first possible implementation manner of the third aspect to the fifth possible implementation manner of the third aspect, in a seventh possible implementation manner, the information about the first NS received by the receiving unit includes instantiation information of the first NS and an identifier of the first NS, and the determining unit is further configured to determine the mapping relationship between the first NS and the N VNFs according to the identifier of the first NS and the information about the N VNFs, or determine the mapping relationship between the first NS and the N VNFs according to the instantiation information of the first NS, the identifier of the first NS, and the information about the N VNFs.

With reference to the seventh possible implementation manner of the third aspect, in an eighth possible implementation manner, the NM further includes an allocation unit, where the allocation unit is configured to allocate the identifier of the first NS to the first NS before the sending unit sends the NS instantiation request message to the NFVO.

With reference to the third aspect or any one of the first possible implementation manner of the third aspect to the fifth possible implementation manner of the third aspect, in a ninth possible implementation manner, the information about the first NS received by the receiving unit includes instantiation information of the first NS, and the determining unit is further configured to allocate an identifier of the first NS to the first NS according to the instantiation information of the first NS, and determine the mapping relationship between the first NS and the N VNFs according to the identifier of the first NS and the information about the N VNFs, or determine the mapping relationship between the first NS and the N VNFs according to the instantiation information of the first NS, the identifier of the first NS, and the information about the N VNFs.

According to a fourth aspect, the present disclosure provides an NFVO, including a receiving unit configured to receive an NS instantiation request message sent by an NM, where the NS instantiation request message carries information about a first NS, and the NS instantiation request message is used to request the NFVO to perform instantiation for the first NS, an obtaining unit configured to obtain, according to the information about the first NS received by the receiving unit, information about N VNFs forming the first NS, where information about each VNF in the information about the N VNFs is used to represent the VNF in the N VNFs, and N≥1, and a sending unit configured to send an NS instantiation completion message to the NM, where the NS instantiation completion message is used to indicate that instantiation for the first NS is completed, the NS instantiation completion message carries the information about the first NS received by the receiving unit and the information about the N VNFs obtained by the obtaining unit, and the information about the first NS and the information about the N VNFs are used by the NM to determine a mapping relationship between the first NS and the N VNFs.

In a first possible implementation manner of the fourth aspect, the information about the first NS received by the receiving unit includes instantiation information of the first NS, where the instantiation information of the first NS includes instantiation information of the N VNFs, and the obtaining unit further includes a sending module, a receiving module, and an obtaining module, where the sending module is configured to send a search indication message to a VNFM, where the search indication message carries the instantiation information of the first NS, and the search indication message is used to instruct the VNFM to search for the N VNFs according to the instantiation information of the first NS. The receiving module is configured to receive a search response message that is sent by the VNFM and that corresponds to the search indication message sent by the sending module, where the search response message is used to determine an instantiation completed VNF and an instantiation uncompleted VNF in the N VNFs, and the obtaining module is configured to obtain information about the instantiation completed VNF in the N VNFs and information about the instantiation uncompleted VNF in the N VNFs according to the search response message received by the receiving module.

With reference to the first possible implementation manner of the fourth aspect, in a second possible implementation manner, the obtaining module is further configured to obtain, according to the search response message, the information about the instantiation completed VNF in the N VNFs from VNF information saved in the NFVO, or obtain the information about the instantiation completed VNF in the N VNFs from the search response message.

With reference to the first possible implementation manner of the fourth aspect, in a third possible implementation manner, the obtaining module is further configured to send at least one VNF instantiation request message to the VNFM according to the search response message, and receive at least one VNF instantiation completion message that is sent by the VNFM and that corresponds to the at least one VNF instantiation request message, where the at least one VNF instantiation request message is used to request the VNFM to instantiate the instantiation uncompleted VNF in the N VNFs, and the at least one VNF instantiation completion message carries the information about the instantiation uncompleted VNF in the N VNFs.

With reference to any one of the first possible implementation manner of the fourth aspect to the third possible implementation manner of the fourth aspect, in a fourth possible implementation manner, the information about each VNF obtained by the obtaining unit includes at least one of an IP address of the VNF represented by the information about the VNF or a first identifier of the VNF, where the IP address of the VNF is used to uniquely represent the VNF, and the first identifier of the VNF is used to uniquely represent the VNF.

With reference to the fourth possible implementation manner of the fourth aspect, in a fifth possible implementation manner, the first identifier of the VNF obtained by the obtaining unit includes at least an identifier of the VNF.

With reference to the fifth possible implementation manner of the fourth aspect, in a sixth possible implementation manner, the first identifier of the VNF obtained by the obtaining unit further includes an identifier of the VNFM, or the identifier of the VNFM and an identifier of the NFVO, where the VNFM is connected to the VNF.

With reference to the fifth possible implementation manner of the fourth aspect or the sixth possible implementation manner of the fourth aspect, in a seventh possible implementation manner, the identifier of the VNF obtained by the obtaining unit is allocated to the VNF by the NFVO, the NM, an EM, or the VNFM connected to the VNF.

With reference to any one of the fourth possible implementation manner of the fourth aspect to the seventh possible implementation manner of the fourth aspect, in an eighth possible implementation manner, the IP address of the VNF obtained by the obtaining unit is allocated to the VNF by the NFVO, the NM, the EM, or the VNFM connected to the VNF.

According to a fifth aspect, the present disclosure provides a communications system, including the NM according to the third aspect or any one of the possible implementation manners of the third aspect, the NFVO according to the fourth aspect or any one of the possible implementation manners of the fourth aspect, an EM connected to the NM, a VNFM connected to the NFVO, and N VNFs connected to both the VNFM and the EM, where the EM is connected to the VNFM, and N≥1.

The present disclosure provides a method for associating an NS with a VNF, an apparatus, and a system. Further, an NM sends an NS instantiation request message to an NFVO, receives an NS instantiation completion message sent by the NFVO, and determines a mapping relationship between a first NS and N VNFs according to information about the first NS and information about the N VNFs. The NS instantiation request message carries the information about the first NS, and the NS instantiation request message is used to request the NFVO to perform instantiation for the first NS according to the NS instantiation request message. The NS instantiation completion message is used to indicate that instantiation for the first NS is completed, and the NS instantiation completion message carries the information about the first NS and the information about the N VNFs. Information about each VNF in the information about the N VNFs is used to represent the VNF in the N VNFs forming the first NS, and N≥1. By means of the method for associating an NS with a VNF, the apparatus, and the system that are provided in the present disclosure, the NM may determine the mapping relationship between the first NS and the N VNFs by obtaining the information about the first NS and the information about the N VNFs forming the first NS and according to the information about the first NS and the information about the N VNFs. Therefore, the NM can determine the N VNFs forming the first NS, and maintain the first NS.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 1 is a block diagram of an NVF system;

FIG. 2 is a first flowchart of a method for associating an NS with a VNF according to an embodiment of the present disclosure;

DESCRIPTION OF EMBODIMENTS

Figure 3:
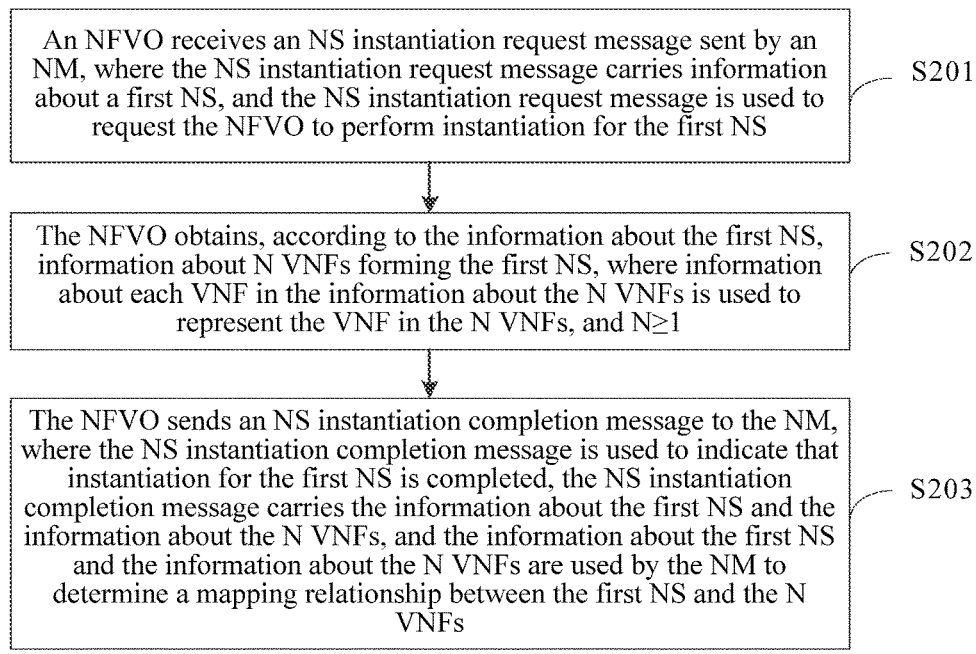
FIG. 3 is a second flowchart of a method for associating an NS with a VNF according to an embodiment of the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Before a method for associating an NS with a VNF provided in the embodiments of the present disclosure is described, a system related to the method for associating an NS with a VNF provided in the embodiments of the present disclosure is first briefly described. As shown in FIG. 1, FIG. 1 is a block diagram of an NVF system.

The NFV system mainly includes an NFVO, a VNFM, a virtualized infrastructure manager (VIM), an operations support system (OSS)/a business support system (BSS), an EM, a VNF node, and NFV infrastructure (NFVI). The NFVO, the VNFM, and the VIM constitute management and orchestration of the NFV system (NFV-MANO).

The NFVO deploys, operates, manages, and coordinates the VNF and the NFVI corresponding to the VNF, and is further configured to manage an NS lifecycle. The NFVO interfaces with the VIM, an NM, and the VNFM for direct communication.

The VIM is an entry to infrastructure and resource management, and provides functions, such as configuration and maintenance, resource monitoring, alarm management, and performance management, for hardware and a virtual resource that are related to the infrastructure.

The NFVI provides computing, storage, and network resources needed by NFV.

The VNFM is responsible for VNF lifecycle management, for example, instantiation, extension/contraction, query, update, and termination. The VNFM interfaces with the EM, the VNF, the NFVO, and the VIM for direct communication.

It should be noted that one NFV system may be provided with M (M≥1) VNFMs, and each VNFM is responsible for managing lifecycles of one or more VNFs. Further, an instantiated VNF mentioned in the embodiments of the present disclosure refers to a VNF node that can implement a corresponding function, for example, a node that runs on a virtual machine (VM) and that can implement an SGW function.

The EM is configured to perform application-related parameter configuration for all VNFs in the NFV system.

The NM is configured to manage the NS lifecycle, for example, perform instantiation, extension/contraction, query, update, and termination.

It should be noted that in the embodiments of the present disclosure, the NM may be the OSS/BSS or a user operation interface of the OSS/BSS.

In the embodiments of the present disclosure, the NVF system may be applied to a Long Term Evolution (LTE) communications system, or may be applied to an LTE evolved communications system, for example, an LTE advanced (LTE-A) system. This is not limited in the present disclosure.

Embodiment 1

This embodiment of the present disclosure provides a method for associating an NS with a VNF. As shown in FIG. 2, the method may include the following steps.

Step S101: An NM sends an NS instantiation request message to an NFVO, where the NS instantiation request message carries information about a first NS, and the NS instantiation request message is used to request the NFVO to perform instantiation for the first NS.

When the NM requests to perform instantiation for the first NS, the NM sends the NS instantiation request message to the NFVO. The NS instantiation request message carries the information about the first NS. The information about the first NS includes instantiation information of the first NS. The instantiation information of the first NS further includes instantiation information of N VNFs (N≥1) needed for forming the first NS, that is, information about N VNF instances (info of needed VNF instances). Instantiation information of each VNF in the instantiation information of the N VNFs includes information needed for instantiating the VNF, such as an identifier of a VNF descriptor (VNFD) of the VNF and an identifier of a deployment flavor of the VNF. Therefore, the NFVO determines, according to the instantiation information of the first NS that is included in the information about the first NS, the N VNFs forming the first NS, and performs a related connection operation on the N VNFs to complete instantiation for the first NS.

Step S102: The NM receives an NS instantiation completion message sent by the NFVO, where the NS instantiation completion message is used to indicate that instantiation for the first NS is completed, the NS instantiation completion message carries the information about the first NS and information about N VNFs, information about each VNF in the information about the N VNFs is used to represent the VNF in the N VNFs forming the first NS, and N≥1.

After receiving the NS instantiation completion message that is sent by the NFVO and that corresponds to the NS instantiation request message, the NM obtains the information about the first NS and the information about the N VNFs from the NS instantiation request message. The NM determines, according to the information about the first NS, that instantiation for the first NS is completed, and determines, according to the information about the first NS, that the information about the N VNFs that is carried in the NS instantiation completion message is information about the N VNFs forming the first NS.

The information about each VNF in the information about the N VNFs is used to represent a VNF. N VNFs represented by the information about the N VNFs are the N VNFs forming the first NS.

In this embodiment of the present disclosure, the information about the N VNFs is obtained by the NFVO after the NFVO determines, according to the instantiation information of the first NS that is carried in the NS instantiation request message, the N VNFs forming the first NS during instantiation for the first NS according to the instantiation request message sent by the NM.

It should be noted that the information about each VNF in the information about the N VNFs has a same meaning. For example, information about a VNF in the information about the N VNFs is used as an example to describe the meaning of the information about each VNF in the information about the N VNFs.

Further, the information about the VNF may include at least one of an IP address of the VNF represented by the information about the VNF or a first identifier of the VNF. That is, the information about the VNF may include the IP address of the VNF, may include the first identifier of the VNF, or may include the IP address of the VNF and the first identifier of the VNF. The IP address of the VNF is used to uniquely represent the VNF, and the first identifier of the VNF is used to uniquely represent the VNF.

It should be noted that the IP address of the VNF can uniquely indicate a communication address of the VNF.

Further, in this embodiment of the present disclosure, the first identifier of the VNF includes at least an identifier of the VNF. Further, the first identifier of the VNF may include the identifier of the VNF, may include the identifier of the VNF and an identifier of a VNFM connected to the VNF, or may include the identifier of the VNF, the identifier of the VNFM, and an identifier of the NFVO, or the like.

In this embodiment of the present disclosure, the identifier of the VNF may be allocated to the VNF by the NFVO, by the VNFM connected to the VNF, by an EM, or by the NM.

The IP address of the VNF may be allocated to the VNF by the NFVO, by the VNFM connected to the VNF, by the EM, or by the NM.

Step S103: The NM determines a mapping relationship between the first NS and the N VNFs according to the information about the first NS and the information about the N VNFs.

The information about the first NS may include the instantiation information of the first NS, or may include the instantiation information of the first NS and an identifier of the first NS.

In this embodiment of the present disclosure, when the information about the first NS includes the instantiation information of the first NS, the NM may determine the mapping relationship between the first NS and the N VNFs according to the instantiation information of the first NS and the information about the N VNFs.

Further, the NM may establish a correspondence between the instantiation information of the first NS and the information about the N VNFs. The correspondence is used to represent the mapping relationship between the first NS and the N VNFs. The NM determines the mapping relationship between the first NS and the N VNFs according to the correspondence.

Alternatively, when the information about the first NS includes the instantiation information of the first NS, the NM may allocate an identifier of the first NS to the first NS according to the instantiation information of the first NS, and determine the mapping relationship between the first NS and the N VNFs according to the identifier of the first NS and the information about the N VNFs. Alternatively, after allocating the identifier of the first NS to the first NS according to the instantiation information of the first NS, the NM determines the mapping relationship between the first NS and the N VNFs according to the instantiation information of the first NS, the identifier of the first NS, and the information about the N VNFs.

Further, the NM may establish a correspondence between the identifier of the first NS and the information about the N VNFs. The correspondence is used to represent the mapping relationship between the first NS and the N VNFs. Alternatively, the NM may establish a correspondence between the instantiation information of the first NS, the identifier of the first NS, and the information about the N VNFs. The correspondence is used to represent the mapping relationship between the first NS and the N VNFs. The NM determines the mapping relationship between the first NS and the N VNFs according to the established correspondence.

Further, in this embodiment of the present disclosure, the NM may generate, for the first NS according to a preset algorithm, an identifier that can uniquely represent the first NS. For example, the identifier of the first NS may be a character string, an American standard code for information interchange (ASCII), or a binary-coded decimal (BCD) code that is generated by the NM according to the preset algorithm.

When the information about the first NS includes the instantiation information of the first NS and the identifier of the first NS, the NM may determine the mapping relationship between the first NS and the N VNFs according to the instantiation information of the first NS, the identifier of the first NS, and the information about the N VNFs.

Further, the NM may establish a correspondence between the information about the first NS and the information about the N VNFs. The correspondence is used to represent the mapping relationship between the first NS and the N VNFs. The NM determines the mapping relationship between the first NS and the N VNFs according to the correspondence.

Alternatively, when the information about the first NS includes the instantiation information of the first NS and the identifier of the first NS, the NM may determine the mapping relationship between the first NS and the N VNFs according to the identifier of the first NS and the information about the N VNFs.

Further, the NM may establish a correspondence between the identifier of the first NS and the information about the N VNFs. The correspondence is used to represent the mapping relationship between the first NS and the N VNFs. The NM determines the mapping relationship between the first NS and the N VNFs according to the correspondence.

It should be noted that if the information about the first NS includes the instantiation information of the first NS and the identifier of the first NS, before the NM sends the NS instantiation request message to the NFVO, the NM has allocated the identifier of the first NS to the first NS.

For example, it is assumed that the first NS includes VNF1, VNF2, and VNF3, information about VNF1 that is obtained by the NM from the NS instantiation completion message includes an identifier of VNF1 and an IP address of VNF1 (this may be expressed as VNF ID1+IP address 1), information about VNF2 that is obtained by the NM from the NS instantiation completion message includes an identifier of VNF2 and an IP address of VNF2 (this may be expressed as VNF ID2+IP address 2), and information about VNF3 that is obtained by the NM from the NS instantiation completion message includes an identifier of VNF3 and an IP address of VNF3 (this may be expressed as VNF ID3+IP address 3). The information about the first NS includes the instantiation information of the first NS.

After receiving the NS instantiation completion message carrying the information about the first NS, the information about VNF1, the information about VNF2, and the information about VNF3, the NM determines, according to the information about the first NS, that the NS instantiation completion message is an NS instantiation completion message for the first NS, that is, the NM determines that instantiation for the first NS is completed. The NM allocates an identifier of the first NS to the first NS, and establishes a correspondence between the identifier of the first NS and the information about VNF1, the information about VNF2, and the information about VNF3. As shown in Table 1, Table 1 shows the correspondence established by the NM between the identifier of the first NS and the information about VNF1, the information about VNF2, and the information about VNF3. The correspondence is used to represent a mapping relationship between the first NS and VNF1, VNF2, and VNF3.

TABLE 1

| Information about an NS | Information about a VNF |
| --- | --- |
| Identifier of the first NS | VNF ID1 + IP address 1 |
|  | VNF ID2 + IP address 2 |
|  | VNF ID3 + IP address 3 |

Alternatively, after receiving the NS instantiation completion message carrying the information about the first NS, the information about VNF1, the information about VNF2, and the information about VNF3, the NM directly establishes a correspondence between the instantiation information of the first NS and the information about VNF1, the information about VNF2, and the information about VNF3. As shown in Table 2, Table 2 shows the correspondence established by the NM between the instantiation information of the first NS and the information about VNF1, the information about VNF2, and the information about VNF3. The correspondence is used to represent a mapping relationship between the first NS and VNF1, VNF2, and VNF3.

TABLE 2

| Information about an NS | Information about a VNF |
| --- | --- |
| Instantiation information of the first NS | VNF ID1 + IP address 1 |
|  | VNF ID2 + IP address 2 |
|  | VNF ID3 + IP address 3 |

In this way, the NM determines, according to the method for associating an NS with a VNF provided in this embodiment of the present disclosure, the mapping relationship between the first NS and the N VNFs forming the first NS, that is, associates the first NS with the N VNFs forming the first NS. Therefore, when the NM maintains the first NS, the NM may maintain the first NS according to the mapping relationship between the first NS and the N VNFs. Maintaining the first NS includes managing a lifecycle and service quality of the first NS and the like, for example, extending, updating, and terminating the first NS.

It may be understood that the NM may determine, according to the method for associating an NS with a VNF provided in this embodiment of the present disclosure, a mapping relationship between each NS in an NFV system (that is, the NFV system in which the NM is located) and N VNFs forming the NS.

Further, it should be noted that one VNF may serve multiple NSs. For example, it is assumed that the first NS includes VNF1, VNF2, and VNF3, and a second NS includes VNF1, VNF4, and VNF5. VNF1 serves the first NS and the second NS. If the information about VNF1, the information about VNF2, the information about VNF3, information about VNF4, and information about VNF5 are respectively expressed as VNF ID1+IP address 1, VNF ID2+IP address 2, VNF ID3+IP address 3, VNF ID4+IP address 4, and VNF ID5+IP address 5, the mapping relationship between the first NS and VNF1, VNF2, and VNF3 and a mapping relationship between the second NS and VNF1, VNF4, and VNF5 may be shown in Table 3.

TABLE 3

| Information about an NS | Information about a VNF |
| --- | --- |
| Identifier of the first NS | VNF ID1 + IP address 1 |
|  | VNF ID2 + IP address 2 |
|  | VNF ID3 + IP address 3 |
| Identifier of the second NS | VNF ID1 + IP address 1 |
|  | VNF ID4 + IP address 4 |
|  | VNF ID5 + IP address 5 |

In this way, the NM determines, according to the method for associating an NS with a VNF provided in this embodiment of the present disclosure, the mapping relationship between each NS in the NFV system and the N VNFs forming the NS. Therefore, the NM may maintain an NS in the NFV system according to the mapping relationship between each NS in the NFV system and the N VNFs forming the NS.

For example, it is assumed that the mapping relationship determined by the NM is shown in Table 3. When the NM determines that VNF1 is faulty, the NM may determine, according to the information about VNF1 "VNF ID1+IP address 1," that both the first NS and the second NS are associated with VNF1. Therefore, the NM may determine both the first NS and the second NS cannot normally provide a service due to the fault of VNF1, and determines that the first NS and the second NS need to be maintained.

Optionally, the NM may terminate the faulty VNF1, and instructs the NFVO to instantiate a new VNF. The new VNF may be represented by VNF6. The NM reestablishes topology structures of the first NS and the second NS such that VNF6 replaces VNF1 to serve the first NS and the second NS, that is, VNF1 is replaced with VNF6.

Further, after terminating the faulty VNF1, the NM determines, according to the information about VNF1, that the first NS and the second NS need to be updated. Therefore, the NM initiates update on the first NS and the second NS. Further, the NM sends an update request message for the first NS to the NFVO to request the NFVO to update the first NS. After receiving the update request message for the first NS, the NFVO determines VNF2 and VNF3 that form the first NS and instantiates VNF6 according to an NS update requirement carried in the update request message for the first NS. After completing instantiation on VNF6, the NFVO performs a related connection operation on VNF6, VNF3, and VNF2 to complete update on the first NS. Further, the NM sends an update request message for the second NS to the NFVO to request the NFVO to update the second NS. After receiving the update request message for the second NS, the NFVO determines, according to an NS update requirement carried in the update request message for the second NS, VNF4, VNF5, and VNF6 that form the second NS, and performs a related connection operation on VNF6, VNF4, and VNF5 to complete update on the second NS.

In this way, the NM completes maintenance on the first NS and the second NS, that is, replaces the faulty VNF1 in the first NS and the second NS with VNF6 such that the first NS and the second NS can normally provides a service, and the mapping relationship between the first NS and the three VNFs forming the first NS and the mapping relationship between the second NS and the three VNFs forming the second NS are updated when VNF1 is replaced with VNF6. As shown in Table 4, information about VNF6 may be expressed as VNF ID6+IP address 6.

TABLE 4

| Information about an NS | Information about a VNF |
|---|---|
| Identifier of the first NS | VNF ID6 + IP address 6 |
| | VNF ID2 + IP address 2 |
| | VNF ID3 + IP address 3 |
| Identifier of the second NS | VNF ID6 + IP address 6 |
| | VNF ID4 + IP address 4 |
| | VNF ID5 + IP address 5 |

This embodiment of the present disclosure provides a method for associating an NS with a VNF. Further, an NM sends an NS instantiation request message to an NFVO, receives an NS instantiation completion message sent by the NFVO, and determines a mapping relationship between a first NS and N VNFs according to information about the first NS and information about the N VNFs. The NS instantiation request message carries the information about the first NS, and the NS instantiation request message is used to request the NFVO to perform instantiation for the first NS. The NS instantiation completion message is used to indicate that instantiation for the first NS is completed, and the NS instantiation completion message carries the information about the first NS and the information about the N VNFs. Information about each VNF in the information about the N VNFs is used to represent the VNF in the N VNFs forming the first NS, and N≥1. By means of the method, the NM may obtain the information about the first NS and the information about the N VNFs forming the first NS, and determine the mapping relationship between the first NS and the N VNFs according to an identifier of the first NS and the information about the N VNFs. Therefore, the NM can determine the N VNFs forming the first NS, and maintain the first NS.

This embodiment of the present disclosure provides a method for associating an NS with a VNF. As shown in FIG. 3, the method may include the following steps.

Step S201: An NFVO receives an NS instantiation request message sent by an NM, where the NS instantiation request message carries information about a first NS, and the NS instantiation request message is used to request the NFVO to perform instantiation for the first NS.

Step S202: The NFVO obtains, according to the information about the first NS, information about N VNFs forming the first NS, where information about each VNF in the information about the N VNFs is used to represent the VNF in the N VNFs, and N≥1.

In this embodiment of the present disclosure, when the NFVO obtains the information about the N VNFs forming the first NS, instantiation on all of the N VNFs may be already completed (that is, all of the N VNFs exist), or instantiation on all of the N VNFs may be not completed (that is, all of the N VNFs do not exist), or in the N VNFs, instantiation on some VNFs is completed and instantiation on the other VNFs is not completed (that is, in the N VNFs, some VNFs exist and the other VNFs do not exist).

For an instantiation completed VNF, the NFVO may obtain information about the instantiation completed VNF from VNF information saved in the NFVO, or from a search response message sent by a VNFM. The search response message is a response message corresponding to a search indication message. The search indication message is a message sent by the NFVO to the VNFM to instruct the VNFM to search for the N VNFs.

If the N VNFs include at least one instantiation uncompleted VNF, the NFVO may instruct the VNFM to instantiate the at least one instantiation uncompleted VNF (that is, initiate instantiation on the at least one instantiation uncompleted VNF) in order to obtain information about the at least one instantiation uncompleted VNF.

Further, the NFVO uses a same method to obtain information about each of the at least one instantiation uncompleted VNF. One of the at least one instantiation uncompleted VNF is used as an example for description below.

For example, when the NFVO needs to obtain information about one of the at least one instantiation uncompleted VNF, the NFVO sends a VNF instantiation request message to the VNFM to instruct the VNFM to instantiate the instantiation uncompleted VNF according to the VNF instantiation request message. After completing instantiation on the instantiation uncompleted VNF, the VNFM adds the information about the instantiation uncompleted VNF to a VNF instantiation completion message, and sends the VNF instantiation completion message to the NFVO. The NFVO obtains the information about the instantiation uncompleted VNF from the VNF instantiation completion message.

Further, an instantiation uncompleted VNF in the at least one VNF refers to a VNF that needs to be instantiated by the NFVO when the NFVO obtains the information about the N VNFs.

Step S203: The NFVO sends an NS instantiation completion message to the NM, where the NS instantiation completion message is used to indicate that instantiation for the first NS is completed, the NS instantiation completion message carries the information about the first NS and the information about the N VNFs, and the information about the first NS and the information about the N VNFs are used by the NM to determine a mapping relationship between the first NS and the N VNFs.

The information about the N VNFs has a meaning the same as that of the information about the N VNFs in the embodiment shown in FIG. 2. For details, refer to the related description in the embodiment shown in FIG. 2, and details are not described again herein.

Further, for details of determining, by the NM, the mapping relationship between the first NS and the N VNFs according to the information about the first NS and the information about the N VNFs, refer to the related description in the embodiment shown in FIG. 2, and details are not described again herein.

This embodiment of the present disclosure provides a method for associating an NS with a VNF. Further, an NFVO receives an NS instantiation request message sent by an NM, obtains, according to the NS instantiation request message, information about N VNFs forming a first NS, and sends an NS instantiation completion message to the NM. The NS instantiation request message carries information about the first NS, and the NS instantiation request message is used to request the NFVO to perform instantiation for the first NS. Information about each VNF in the information about the N VNFs is used to represent the VNF in the N VNFs, and N≥1. The NS instantiation completion message is used to indicate that instantiation for the first NS is completed, and the NS instantiation completion message carries the information about the first NS and the information about the N VNFs. The information about the first NS and the information about the N VNFs are used by the NM to determine a mapping relationship between the first NS and the N VNFs. By means of the method, the NFVO can obtain, according to the information about the first NS that is carried in the NS instantiation request message sent by the NM, the information about the N VNFs forming the first NS, and send the information about the first NS and the information about the N VNFs to the NM such that the NM determines the mapping relationship between the first NS and the N VNFs according to the information about the first NS and the information about the N VNFs. Therefore, the NM can determine the N VNFs forming the first NS, and maintain the first NS.

Embodiment 2

Figure 4:
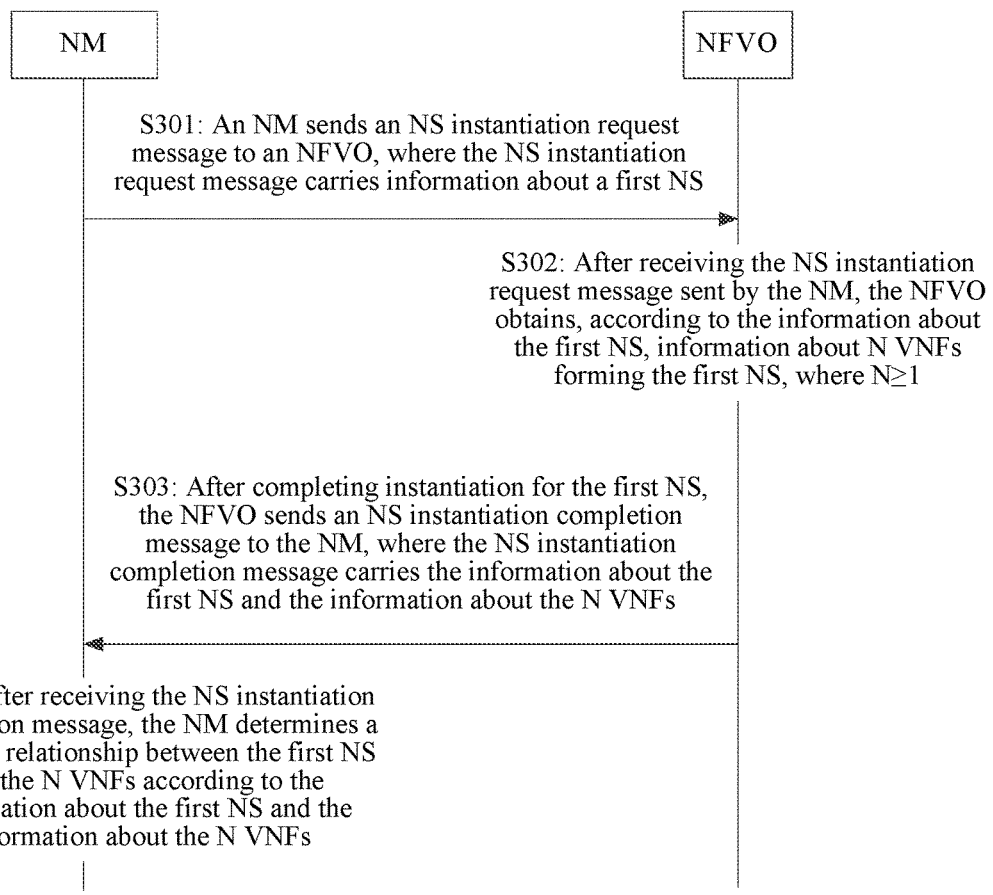
FIG. 4 is a third flowchart of a method for associating an NS with a VNF according to an embodiment of the present disclosure.

This embodiment of the present disclosure provides a method for associating an NS with a VNF. As shown in FIG. 4, the method may include the following steps.

Step S301: An NM sends an NS instantiation request message to an NFVO, where the NS instantiation request message carries information about a first NS.

Step S302: After receiving the NS instantiation request message sent by the NM, the NFVO obtains, according to the information about the first NS, information about N VNFs forming the first NS, where N≥1.

Step S303: After completing instantiation for the first NS, the NFVO sends an NS instantiation completion message to the NM, where the NS instantiation completion message carries the information about the first NS and the information about the N VNFs.

Step S304: After receiving the NS instantiation completion message, the NM determines a mapping relationship between the first NS and the N VNFs according to the information about the first NS and the information about the N VNFs.

For details of a manner for determining, by the NM, the mapping relationship between the first NS and the N VNFs according to the information about the first NS and the information about the N VNFs, refer to the related description in the embodiment shown in FIG. 2, and details are not described again herein.

It should be noted that in step S302, when obtaining, according to the information about the first NS, the information about the N VNFs forming the first NS, the NFVO needs to determine whether instantiation on the N VNFs is completed.

Further, the NFVO may send a search indication message to a VNFM to instruct the VNFM to search for the N VNFs.

Further, the information about the first NS includes instantiation information of the first NS. The instantiation information of the first NS further includes instantiation information of the N VNFs, and instantiation information of each VNF in the instantiation information of the N VNFs represents information needed when the VNF in the N VNFs forming the first NS is instantiated. Therefore, the NFVO may add the instantiation information of the first NS to the search indication message such that the VNFM searches for the N VNFs according to the instantiation information of the N VNFs that is further included in the instantiation information of the first NS.

Further, the VNFM may search, for the N VNFs according to the instantiation information of the N VNFs, information about an instantiation completed VNF that is saved in the VNFM.

For example, it is assumed that the instantiation information of the first NS includes instantiation information of three VNFs, VNFD1 and deployment flavor 1, VNFD2 and deployment flavor 2, and VNFD3 and deployment flavor 3. VNFD1 and deployment flavor 1 represent information needed when VNF1 in the three VNFs forming the first NS is instantiated, that is, instantiation information of VNF1. VNFD2 and deployment flavor 2 represent information needed when VNF2 in the three VNFs forming the first NS is instantiated, that is, instantiation information of VNF2. VNFD3 and deployment flavor 3 represent information needed when VNF3 in the three VNFs forming the first NS is instantiated, that is, instantiation information of VNF3.

The VNFM searches the saved information about the instantiation completed VNF according to the instantiation information of the first NS for VNFs instantiated according to the instantiation information of the three VNFs. The VNFM determines that VNFD1 and deployment flavor 1 are information needed when an instantiation completed VNF1 is instantiated, and VNFD2 and deployment flavor 2 are information needed when an instantiation completed VNF2 is instantiated. The information about the instantiation completed VNF saved in the VNFM does not have a VNF instantiated according to VNFD3 and deployment flavor 3. Therefore, the VNFM finds VNF1 and VNF2 according to the instantiation information of the first NS but fails to find VNF3, that is, the VNFM determines that instantiation on VNF1 and VNF2 is completed, but instantiation on VNF3 is not completed.

After determining an instantiation completed VNF in the N VNFs and an instantiation uncompleted VNF in the N VNFs, the VNFM sends a search response message to the NFVO such that the NFVO obtains information about the instantiation completed VNF in the N VNFs and information about the instantiation uncompleted VNF in the N VNFs according to the search response message.

It should be noted that all of the N VNFs may be instantiation completed VNFs, or all of the N VNFs may be instantiation uncompleted VNFs, or some of the N VNFs are instantiation completed VNFs, and the others are instantiation uncompleted VNFs.

To better describe a specific implementation manner for obtaining, by the NFVO, the information about the instantiation completed VNF in the N VNFs and the information about the instantiation uncompleted VNF in the N VNFs according to the search response message, below, the instantiation completed VNF in the N VNFs is referred to as a first VNF, the information about the instantiation completed VNF in the N VNFs is referred to as information about the first VNF, the instantiation uncompleted VNF in the N VNFs is referred to as a second VNF, and the information about the instantiation uncompleted VNF in the N VNFs is referred to as information about the second VNF to describe in detail the specific implementation manner for obtaining, by the NFVO, the information about the instantiation completed VNF in the N VNFs and the information about the instantiation uncompleted VNF in the N VNFs according to the search response message.

Optionally, the search response message may carry instantiation information of the first VNF to indicate that instantiation on the first VNF in the N VNFs is completed. After receiving the search response message, the NFVO obtains the information about the first VNF and the information about the second VNF according to the search response message.

Further, after receiving the search response message, the NFVO searches VNF information, saved in the NFVO, according to the instantiation information of the first VNF that is carried in the search response message, for the first VNF instantiated according to the instantiation information of the first VNF, and obtains the information about the first VNF from the VNF information.

For example, it is assumed that the search response message carries instantiation information of two first VNFs, instantiation information of VNF1, that is, VNFD1 and deployment flavor 1, and instantiation information of VNF2, that is, VNFD2 and deployment flavor 2. The NFVO searches the VNF information, saved in the NFVO, for VNF1 and VNF2 according to the instantiation information of the two first VNFs. After finding VFN1 and VNF2, the NFVO obtains information about VNF1 and information about VNF2 from the VNF information saved in the NFVO.

Further, the NFVO determines instantiation information of the second VNF (that is, instantiation information of VNFs in the instantiation information of the N VNFs except the instantiation information of the first VNF) according to the instantiation information of the first VNF and the instantiation information of the N VNFs that are carried in the search response message. The NFVO initiates instantiation on the second VNF according to the instantiation information of the second VNF, and obtains the information about the second VNF.

Further, the NFVO sends a VNF instantiation request message to the VNFM to request the VNFM to instantiate the second VNF. The VNF instantiation request message carries the instantiation information of the second VNF. After completing instantiation on the second VNF, the VNFM sends a VNF instantiation completion message corresponding to the VNF instantiation request message to the NFVO. The instantiation completion message carries the information about the second VNF. After the NFVO receives the VNF instantiation completion message, the NFVO obtains the information about the second VNF from the VNF instantiation completion message.

Optionally, the search response message may carry the instantiation information of the first VNF and the information about the first VNF.

Further, after receiving the search response message, the NFVO may directly obtain the information about the first VNF from the search response message. Further, the NFVO determines the instantiation information of the second VNF according to the instantiation information of the first VNF and the instantiation information of the N VNFs that are carried in the search response message. The NFVO initiates instantiation on the second VNF according to the instantiation information of the second VNF, and obtains the information about the second VNF.

Optionally, the search response message may carry the instantiation information of the second VNF.

Further, after receiving the search response message, the NFVO initiates instantiation on the second VNF according to the instantiation information of the second VNF that is carried in the search response message, and obtains the information about the second VNF.

Further, the NFVO determines the instantiation information of the first VNF (that is, instantiation information of VNFs in the instantiation information of the N VNFs except the instantiation information of the first VNF) according to the instantiation information of the second VNF and the instantiation information of the N VNFs that are carried in the search response message, searches the VNF information, saved in the NFVO, according to the instantiation information of the first VNF for the first VNF instantiated according to the instantiation information of the first VNF, and obtains the information about the first VNF from the VNF information.

Optionally, the search response message may carry the instantiation information of the first VNF and a particular field indicating that instantiation is completed, and the instantiation information of the second VNF and a particular field indicating that instantiation is not completed.

Further, after receiving the search response message, the NFVO determines, according to the instantiation information of the first VNF and the particular field indicating that instantiation is completed that are carried in the search response message, that the instantiation information of the first VNF is information about an instantiation completed VNF in the N VNFs, searches the VNF information, saved in the NFVO, according to the instantiation information of the first VNF for the first VNF instantiated according to the instantiation information of the first VNF, and obtains the information about the first VNF from the VNF information saved in the NFVO. The NFVO determines, according to the instantiation information of the second VNF and the particular field indicating that instantiation is not completed that are carried in the search response message, that the instantiation information of the second VNF is information about an instantiation uncompleted VNF in the N VNFs, initiates instantiation on the second VNF according to the instantiation information of the second VNF, and obtains the information about the second VNF.

Optionally, the search response message may carry the instantiation information of the first VNF, the information about the first VNF, and the instantiation information of the second VNF.

After receiving the search response message, the NFVO determines, according to the instantiation information of the first VNF and the information about the first VNF that are carried in the search response message, that the instantiation information of the first VNF is information about an instantiation completed VNF in the N VNFs, and directly obtains the information about the first VNF from the search response message.

Further, after the NFVO obtains the instantiation information of the second VNF that is carried in the search response message, because the instantiation information of the second VNF does not have corresponding information about the second VNF, the NFVO determines that the second VNF is information about an instantiation uncompleted VNF in the N VNFs, initiates instantiation on the second VNF according to the instantiation information of the second VNF, and obtains the information about the second VNF.

In this embodiment of the present disclosure, information about each VNF is allocated to the VNF by an EM, the VNFM, the NM, or the NFVO such that the NFVO can obtain the information about each VNF. For example, when the VNFM instantiates the VNF, the EM, the VNFM, the NM, or the NFVO allocates the information about the VNF to the VNF. Further, to better describe the manner for obtaining, by the NFVO, the information about the VNF in this embodiment of the present disclosure, the following uses a first VNF as an example to further describe the manner for obtaining, by the NFVO, the information about the VNF with reference to FIG. 5 in combination with a process in which the VNFM instantiates the first VNF.

Figure 5:
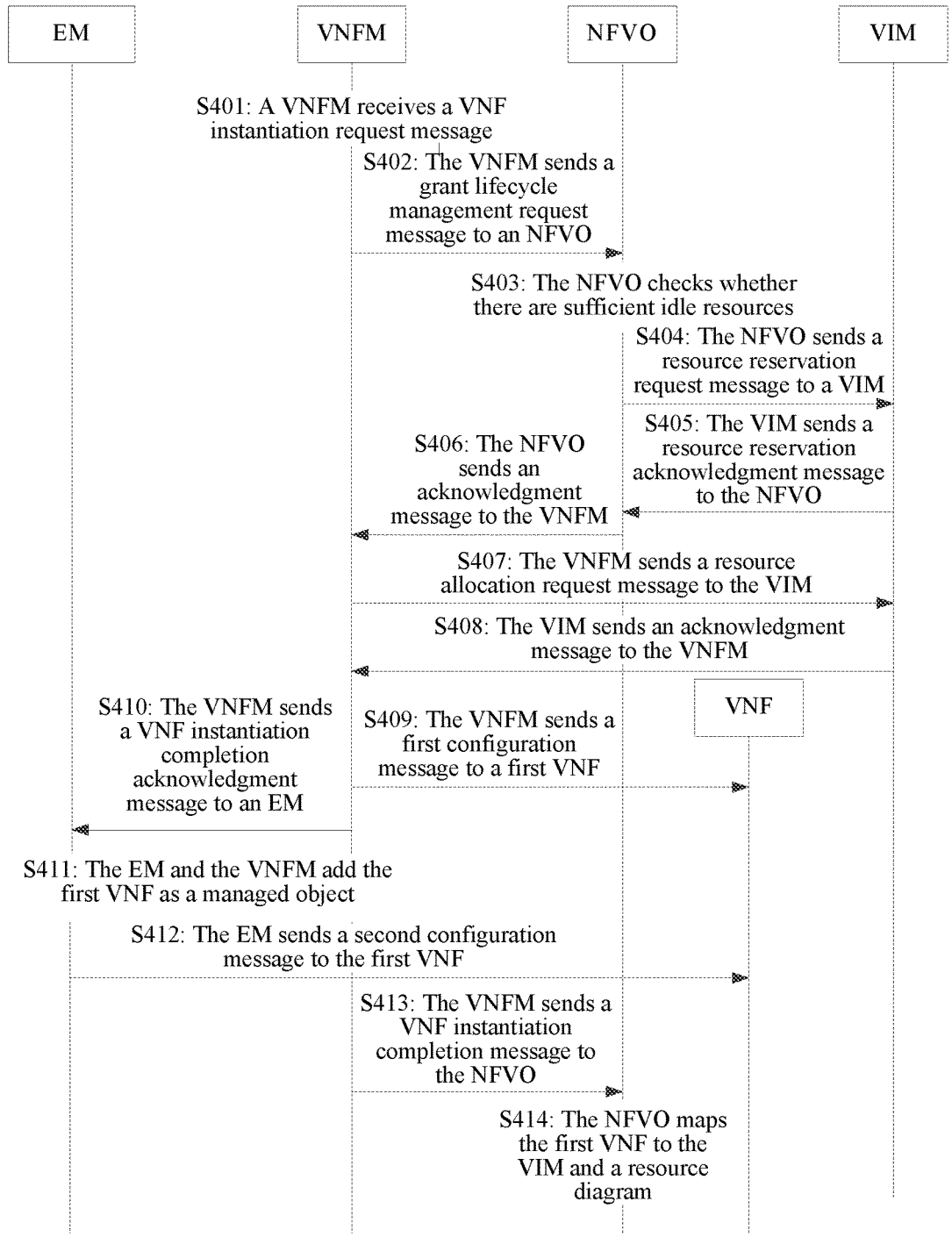
FIG. 5 is a flowchart of instantiation on a first VNF according to an embodiment of the present disclosure.

As shown in FIG. 5, the process in which the VNFM instantiates the first VNF includes the following steps.

Step S401: The VNFM receives a VNF instantiation request message.

The VNF instantiation request message received by the VNFM may be sent by the NFVO, the EM, or the NM, or may be generated by the VNFM. The NM may send the VNF instantiation request message using the EM or the NFVO.

The VNF instantiation request message carries instantiation information of the first VNF, including an identifier of a VNFD, an identifier of a deployment flavor, and the like that are needed when the first VNF is instantiated.

Step S402: The VNFM sends a grant lifecycle management request (grant lifecycle operation) message to the NFVO.

The grant lifecycle management request message is used to instruct the NFVO to instantiate the first VNF according to the instantiation information of the first VNF such as the identifier of the VNFD and the identifier of the deployment flavor.

Step S403: The NFVO checks whether there are sufficient idle resources.

Step S404: The NFVO sends a resource reservation request (create resource reservation) message to a VIM.

Step S405: The VIM sends a resource reservation acknowledgment (result of reservation) message to the NFVO.

Step S406: The NFVO sends an acknowledgment message to the VNFM.

Optionally, in this step, the acknowledgment message includes an identifier of the VIM that can allocate a resource.

S407: The VNFM sends a resource allocation request (allocate resource) message to the VIM.

The resource allocation request message is used to request the VIM to create and start a VM as instructed by the NFVO, and the resource allocation request message carries the identifier of the VIM and a parameter of the VM.

Step S408: The VIM sends an acknowledgment message to the VNFM.

Step S409: The VNFM sends a first configuration message to a first VNF.

The first configuration message sent by the VNFM to the first VNF is used to configure a deployment-related parameter for the first VNF.

Step S410: The VNFM sends a VNF instantiation completion acknowledgment message to the EM.

Step S411: The EM and the VNFM add the first VNF as a managed object.

Step S412: The EM sends a second configuration message to the first VNF.

The second configuration message sent by the EM to the first VNF is used to configure an application-related parameter for the first VNF.

Step S413: The VNFM sends a VNF instantiation completion message (notify successful VNF instantiation) to the NFVO.

Step S414: The NFVO maps the first VNF to the VIM and a resource diagram.

Further, in combination with the process in which the VNFM instantiates the first VNF, this embodiment of the present disclosure provides the following several possible implementation manners as examples for description of the manner for obtaining, by the NFVO, the information about the first VNF.

Manner 1: The VNFM allocates an identifier of the first VNF and/or an IP address of the first VNF to the first VNF.

Figure 6:
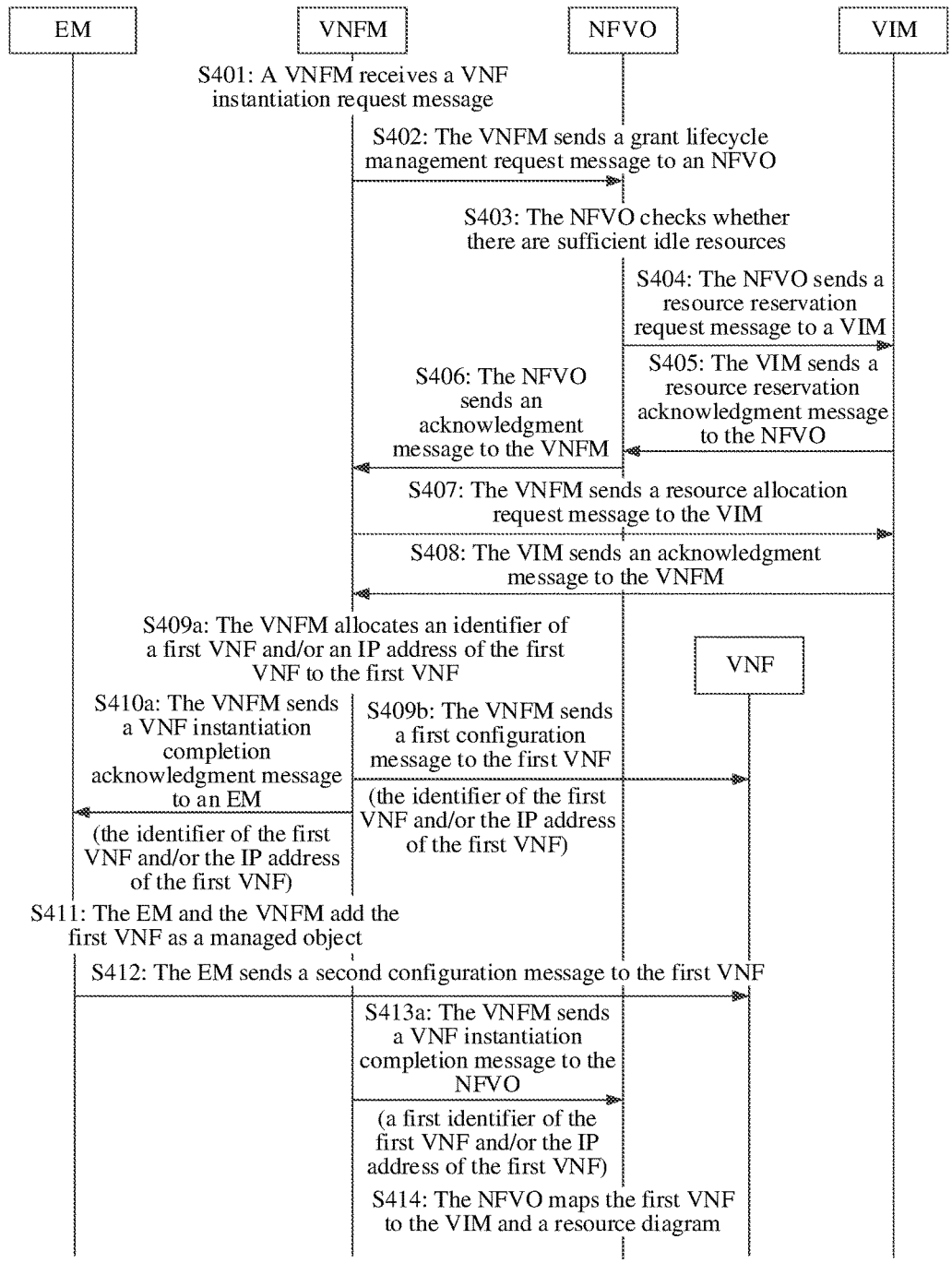
FIG. 6 is a first flowchart of instantiation on a first VNF according to an embodiment of the present disclosure.

In manner 1, with reference to FIG. 5, as shown in FIG. 6, step S409 may include the following steps.

Step S409a: The VNFM allocates an identifier of the first VNF and/or an IP address of the first VNF to the first VNF.

Further, in this embodiment of the present disclosure, the identifier of the first VNF may be an identifier generated by the VNFM for the first VNF according to a preset algorithm. For example, the identifier of the first VNF may be a character string, an ASCII code, or a BCD code that is generated by the VNFM according to the preset algorithm.

Step S409b: The VNFM sends the first configuration message to the first VNF, where the first configuration message carries the identifier of the first VNF and/or the IP address of the first VNF.

Further, as shown in FIG. 6, step S410 and step S413 may include the following steps.

Step S410a: The VNFM sends the VNF instantiation completion acknowledgment message to the EM, where the VNF instantiation completion acknowledgment message carries a first identifier of the first VNF and/or the IP address of the first VNF.

The first identifier of the first VNF includes the identifier of the first VNF and an identifier of the VNFM, or includes the identifier of the first VNF, the identifier of the VNFM, and an identifier of the NFVO.

It should be noted that in an NFV system, there may be multiple VNFMs. When the VNFM connected to the first VNF allocates the identifier to the first VNF, the VNFM can ensure only that the identifier of the first VNF is different from an identifier of another VNF connected to the VNFM, but cannot ensure that the identifier of the first VNF is different from an identifier of a VNF connected to another VNFM. Therefore, to ensure that the first VNF has an identifier that can uniquely represent the first VNF in the NFV system, the identifier of the first VNF allocated by the VNFM to the first VNF and the identifier of the VNFM may be used as the first identifier of the first VNF, or the identifier of the first VNF, the identifier of the VNFM, and the identifier of the NFVO are used as the first identifier of the first VNF such that the first VNF is uniquely represented using the first identifier of the first VNF.

Optionally, in an implementation manner of the present disclosure, to ensure that the first VNF has an identifier that can uniquely represent the first VNF in the NFV system, when the identifier of the first VNF allocated by the VNFM to the first VNF and the identifier of the VNFM are used as the first identifier of the first VNF, the identifier of the VNFM and an identifier of a VNF may or may not be bound together. For example, the identifier of the VNFM is an identifier that is carried in the VNF instantiation completion acknowledgment message by default.

Optionally, in another embodiment of the present disclosure, when the identifier of the first VNF allocated by the VNFM can be ensured to be globally unique, that is, the identifier of the first VNF can be uniquely distinguished in an NFV network, for example, the identifier of the first VNF is generated using an existing Universally Unique Identifier (UU ID) generation method, the VNFM may add the identifier of the first VNF to the instantiation completion acknowledgment message when sending the instantiation completion acknowledgment message to the EM. That is, in this case, the first identifier of the first VNF is the identifier of the first VNF. Optionally, the instantiation completion acknowledgment message may carry the identifier of the first VNF and the identifier of the VNFM. That is, in this case, the first identifier of the first VNF is the identifier of the first VNF and the identifier of the VNFM. Optionally, the instantiation completion acknowledgment message may carry the identifier of the first VNF, the identifier of the VNFM, and the identifier of the NFVO to which the VNFM belongs. That is, in this case, the first identifier of the first VNF is the identifier of the first VNF, the identifier of the VNFM, and the identifier of the NFVO. Similarly, when the VNFM subsequently sends the instantiation completion acknowledgment message to the NFVO, the instantiation completion acknowledgment message may carry the identifier of the first VNF, or may carry the identifier of the first VNF and the identifier of the VNFM.

S413a: The VNFM sends the VNF instantiation completion message to the NFVO, where the VNF instantiation completion message carries the first identifier of the first VNF and/or the IP address of the first VNF.

Manner 2: The EM allocates an identifier of the first VNF and/or an IP address of the first VNF to the first VNF.

Figure 7:
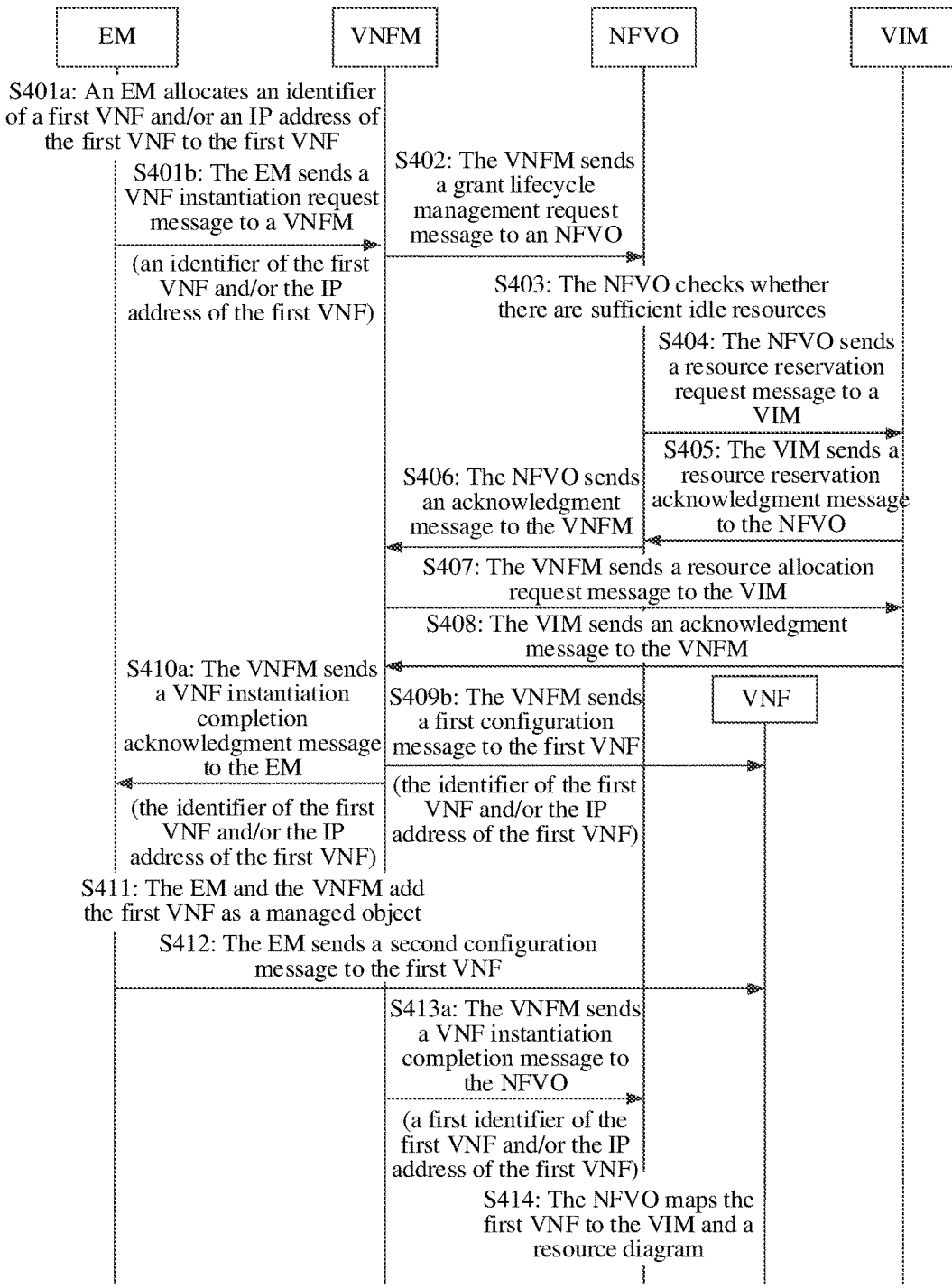
FIG. 7 is a second flowchart of instantiation on a first VNF according to an embodiment of the present disclosure.

In manner 2, it is assumed that instantiation on the first VNF is initiated by the EM. With reference to FIG. 5, as shown in FIG. 7, step S401 includes the following steps.

Step S401a: The EM allocates an identifier of the first VNF and/or an IP address of the first VNF to the first VNF.

Step S401b: The EM sends a VNF instantiation request message to the VNFM, where the VNF instantiation request message carries the identifier of the first VNF and/or the IP address of the first VNF.

Further, step S409 and step S413 may include the following steps.

Step S409b: The VNFM sends the first configuration message to the first VNF, where the first configuration message carries the identifier of the first VNF and/or the IP address of the first VNF.

Step S413a: The VNFM sends the VNF instantiation completion message to the NFVO, where the VNF instantiation completion message carries a first identifier of the first VNF and/or the IP address of the first VNF.

It should be noted that in manner 2, there is one EM in a current NFV system, and the EM configures application-related parameters for all VNFs in the NFV system. Therefore, when the EM allocates the identifier of the first VNF to the first VNF, the identifier of the first VNF allocated by the EM to the first VNF can uniquely represent the first VNF in the NFV system. In this case, the first identifier of the first VNF includes the identifier of the first VNF.

Manner 3: The NM allocates an identifier of the first VNF and/or an IP address of the first VNF to the first VNF.

Figure 8:
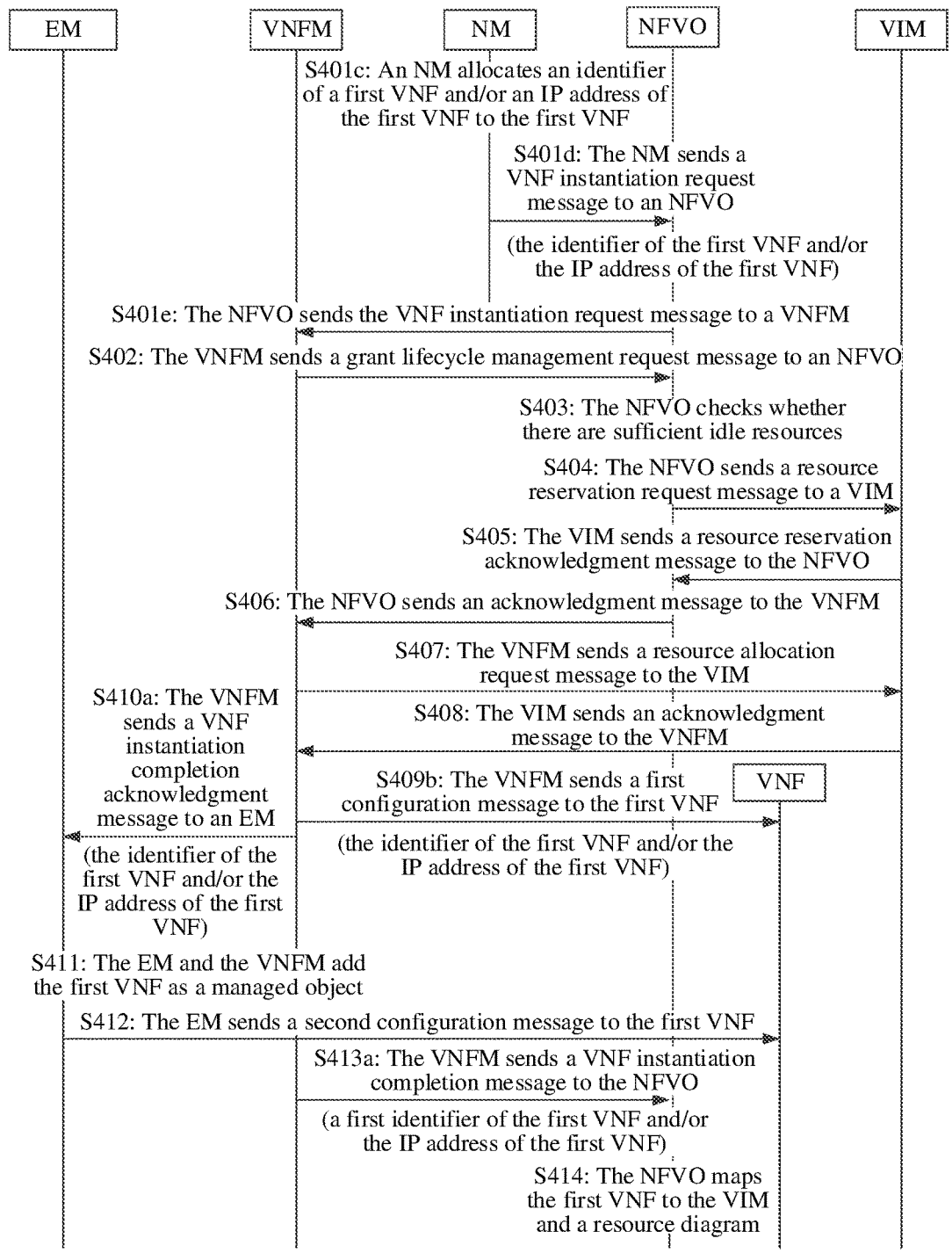
FIG. 8 is a third flowchart of instantiation on a first VNF according to an embodiment of the present disclosure.

In manner 3, it is assumed that instantiation on the first VNF is initiated by the NM. With reference to FIG. 5, as shown in FIG. 8, step S401 includes the following steps.

Step S401c: The NM allocates an identifier of the first VNF and/or an IP address of the first VNF to the first VNF.

Step S401d: The NM sends the VNF instantiation request message to the NFVO, where the VNF instantiation request message carries the identifier of the first VNF and/or the IP address of the first VNF.

Step S401e: The NFVO sends the VNF instantiation request message to the VNFM, where the VNF instantiation request message carries the identifier of the first VNF and/or the IP address of the first VNF.

Further, as shown in FIG. 8, steps S409, S410, and S413 may include the following steps.

Step S409b: The VNFM sends the first configuration message to the first VNF, where the first configuration message carries the identifier of the first VNF and/or the IP address of the first VNF.

Step S410a: The VNFM sends the VNF instantiation completion acknowledgment message to the EM, where the VNF instantiation completion acknowledgment message carries the identifier of the first VNF and/or the IP address of the first VNF.

Step S413a: The VNFM sends the VNF instantiation completion message to the NFVO, where the VNF instantiation completion message carries a first identifier of the first VNF and/or the IP address of the first VNF.

Alternatively, step S401 further includes the following steps.

Step S401c: The NM allocates an identifier of the first VNF and/or an IP address of the first VNF to the first VNF.

Step S401d: The NM sends the VNF instantiation request message to the EM, where the VNF instantiation request message carries the identifier of the first VNF and/or the IP address of the first VNF.

Step S401e: The EM sends the VNF instantiation request message to the VNFM, where the VNF instantiation request message carries the identifier of the first VNF and/or the IP address of the first VNF.

Further, as shown in FIG. 8, steps S409, S410, and S413 may include the following steps.

Step S409b: The VNFM sends the first configuration message to the first VNF, where the first configuration message carries the identifier of the first VNF and/or the IP address of the first VNF.

Step S410a: The VNFM sends the VNF instantiation completion acknowledgment message to the EM.

Step S413a: The VNFM sends the VNF instantiation completion message to the NFVO, where the VNF instantiation completion message carries a first identifier of the first VNF and/or the IP address of the first VNF.

It should be noted that in manner 3, there is one NM in a current NFV system. Therefore, when the NM allocates the identifier of the first VNF to the first VNF, the identifier of the first VNF allocated by NM to the first VNF can uniquely represent the first VNF in the NFV system. In this case, the first identifier of the first VNF includes the identifier of the first VNF.

Manner 4: The NFVO allocates an identifier of the first VNF and/or an IP address of the first VNF to the first VNF.

Figure 9:
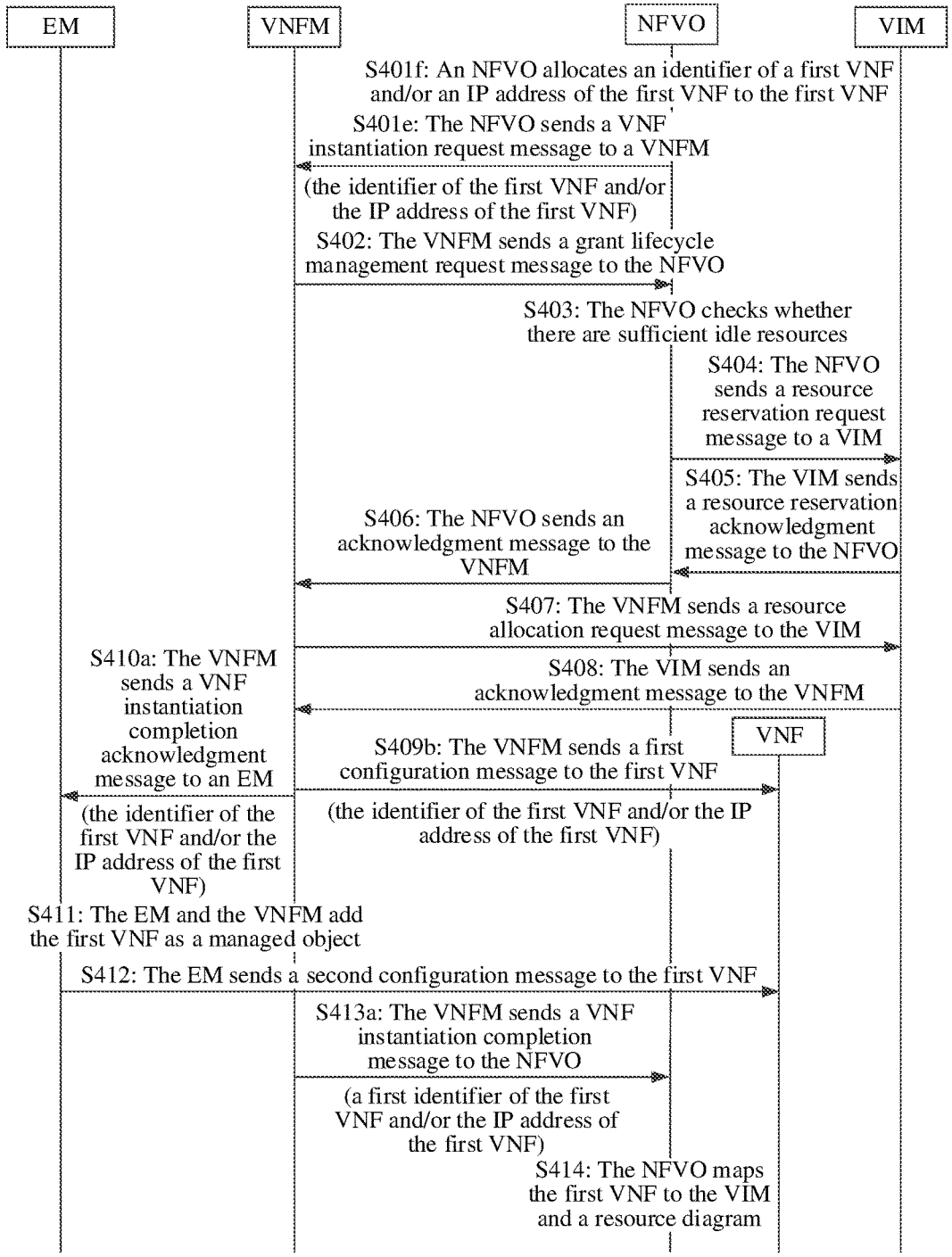
FIG. 9 is a fourth flowchart of instantiation on a first VNF according to an embodiment of the present disclosure.

Further, an implementation manner of manner 4 is similar to an implementation manner of manner 3. With reference to FIG. 8, as shown in FIG. 9, a difference is that step S401 includes the following steps.

Step S401f: The NFVO allocates an identifier of the first VNF and/or an IP address of the first VNF to the first VNF.

Further, if instantiation on the first VNF is initiated by the NM, after receiving the VNF instantiation request message sent by the NM, the NFVO allocates the identifier of the first VNF and/or the IP address of the first VNF to the first VNF. If instantiation on the first VNF is initiated by the NFVO, when determining that the first VNF needs to be instantiated, the NFVO allocates the identifier of the first VNF and/or the IP address of the first VNF to the first VNF.

Step S401e: The NFVO sends the VNF instantiation request message to the VNFM, where the VNF instantiation request message carries the identifier of the first VNF and/or the IP address of the first VNF.

Further, in the foregoing manner 1, manner 2, manner 3, and manner 4 for obtaining information about the first VNF, the information about the first VNF may include the first identifier of the first VNF, may include the IP address of the first VNF, or may include the first identifier of the first VNF and the IP address of the first VNF.

When the information about the first VNF includes the first identifier of the first VNF and the IP address of the first VNF, this embodiment of the present disclosure further provides several other possible manners (manner 5 to manner 16) for more detailed description of the manner for obtaining, by the NFVO, the information about the first VNF.

Manner 5: The VNFM allocates an identifier of the first VNF to the first VNF, and the EM allocates an IP address of the first VNF to the first VNF.

In manner 5, it is assumed that instantiation on the first VNF is initiated by the EM. With reference to FIG. 5, as shown in FIG. 10, step S401 includes the following steps.

Step S401g: The EM allocates an IP address of the first VNF to the first VNF.

Step S401h: The EM sends the VNF instantiation request message to the VNFM, where the VNF instantiation request message carries the IP address of the first VNF.

Figure 10:
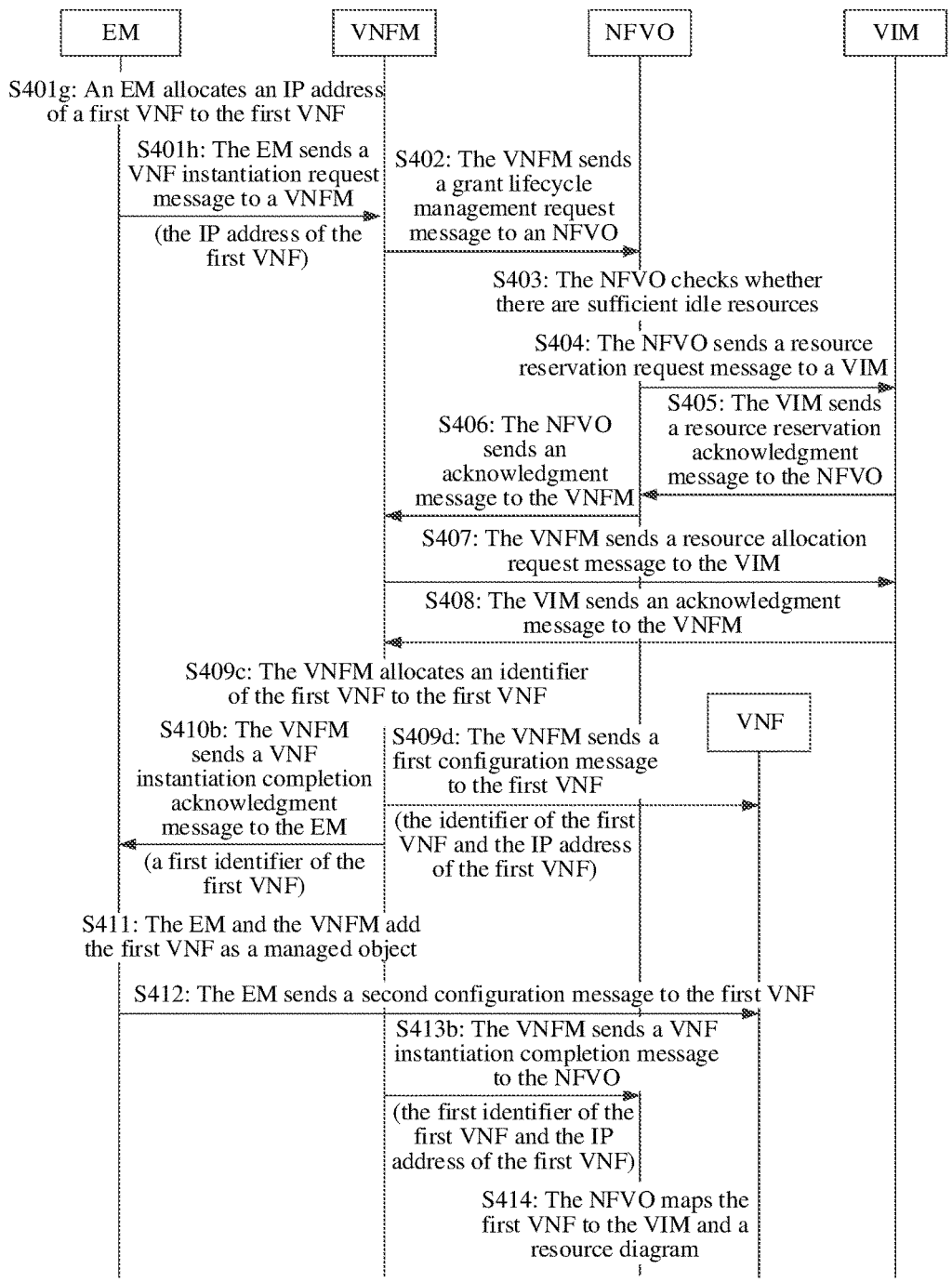
FIG. 10 is a fifth flowchart of instantiation on a first VNF according to an embodiment of the present disclosure.

Further, as shown in FIG. 10, step S409 includes the following steps.

Step S409c: The VNFM allocates an identifier of the first VNF to the first VNF.

Step S409d: The VNFM sends the first configuration message to the first VNF, where the first configuration message carries the identifier of the first VNF and the IP address of the first VNF.

As shown in FIG. 10, steps S410 and S413 may include the following steps.

Step S410b: The VNFM sends the VNF instantiation completion acknowledgment message to the EM, where the VNF instantiation completion acknowledgment message carries a first identifier of the first VNF.

Step S413b: The VNFM sends the VNF instantiation completion message to the NFVO, where the VNF instantiation completion message carries the first identifier of the first VNF and the IP address of the first VNF.

The first identifier of the first VNF includes the identifier of the first VNF and an identifier of the VNFM, or includes the identifier of the first VNF, the identifier of the VNFM, and an identifier of the NFVO.

Manner 6: The VNFM allocates an identifier of the first VNF to the first VNF, and the NM allocates an IP address of the first VNF to the first VNF.

Figure 11:
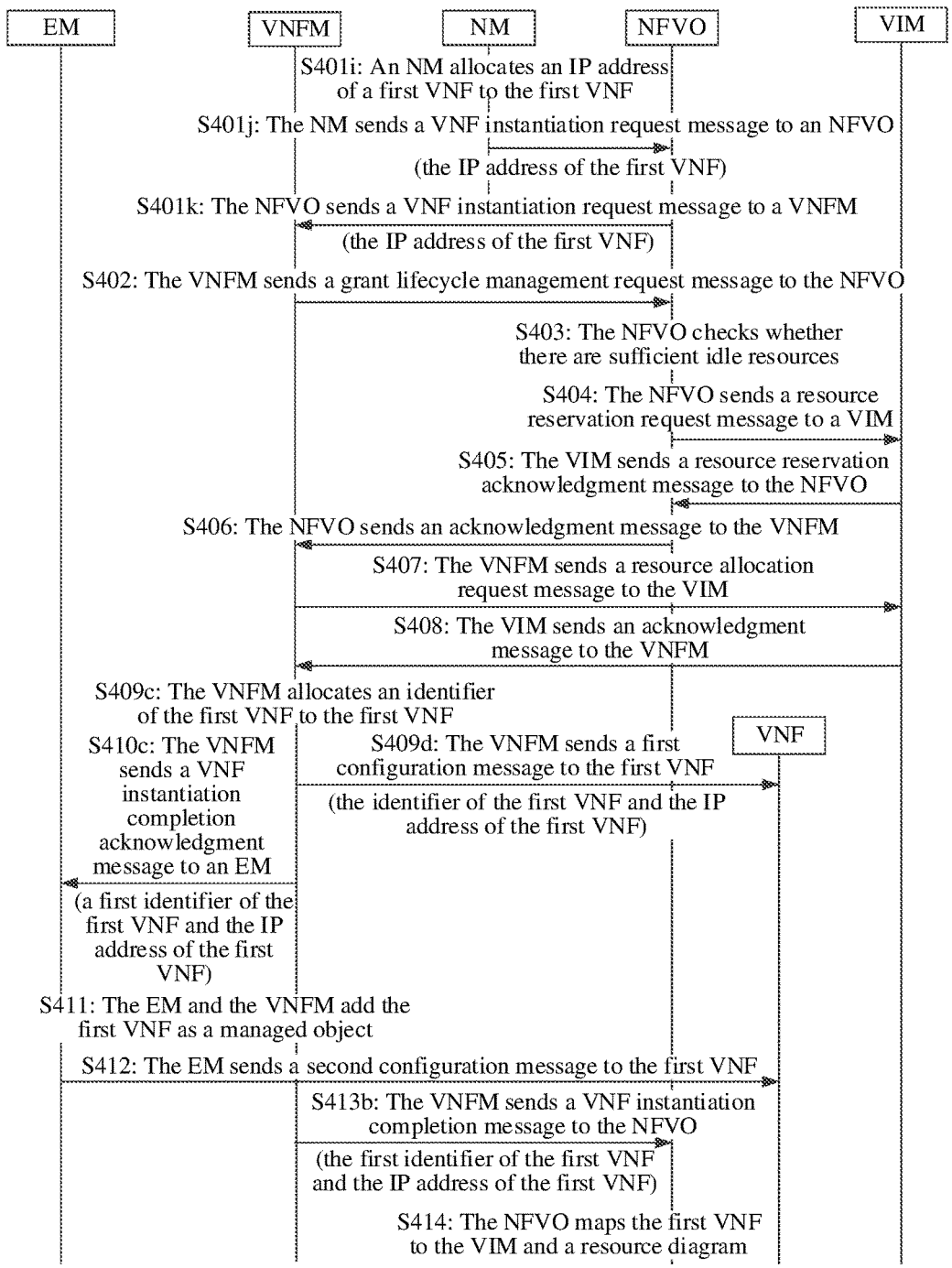
FIG. 11 is a sixth flowchart of instantiation on a first VNF according to an embodiment of the present disclosure.

In manner 6, it is assumed that instantiation on the first VNF is initiated by the NM. With reference to FIG. 5, as shown in FIG. 11, step S401 includes the following steps.

Step S401i: The NM allocates an IP address of the first VNF to the first VNF.

Step S401j: The NM sends the VNF instantiation request message to the NFVO, where the VNF instantiation request message carries the IP address of the first VNF.

Step S401k: The NFVO sends the VNF instantiation request message to the VNFM, where the VNF instantiation request message carries the IP address of the first VNF.

Further, step S409 includes the following steps.

Step S409c: The VNFM allocates an identifier of the first VNF to the first VNF.

Step S409d: The VNFM sends the first configuration message to the first VNF, where the first configuration message carries the identifier of the first VNF and the IP address of the first VNF.

Further, steps S410 and S413 may include the following steps.

Step S410c: The VNFM sends the VNF instantiation completion acknowledgment message to the EM, where the VNF instantiation completion acknowledgment message carries a first identifier of the first VNF and the IP address of the first VNF.

Step S413b: The VNFM sends the VNF instantiation completion message to the NFVO, where the VNF instantiation completion message carries the first identifier of the first VNF and the IP address of the first VNF.

Alternatively, step S401 may further include the following steps.

S401i: The NM allocates an IP address of the first VNF to the first VNF.

S401j: The NM sends the VNF instantiation request message to the EM, where the VNF instantiation request message carries the IP address of the first VNF.

S401k: The EM sends the VNF instantiation request message to the VNFM, where the VNF instantiation request message carries the IP address of the first VNF.

Further, step S409 includes the following steps.

Step S409c: The VNFM allocates an identifier of the first VNF to the first VNF.

Step S409d: The VNFM sends the first configuration message to the first VNF, where the first configuration message carries the identifier of the first VNF and the IP address of the first VNF.

Further, steps S410 and S413 may include the following steps.

Step S410c: The VNFM sends the VNF instantiation completion acknowledgment message to the EM, where the VNF instantiation completion acknowledgment message carries a first identifier of the first VNF.

Step S413b: The VNFM sends the VNF instantiation completion message to the NFVO, where the VNF instantiation completion message carries the first identifier of the first VNF and the IP address of the first VNF.

The first identifier of the first VNF includes the identifier of the first VNF.

Manner 7: The VNFM allocates an identifier of the first VNF to the first VNF, and the NFVO allocates an IP address of the first VNF to the first VNF.

Figure 12:
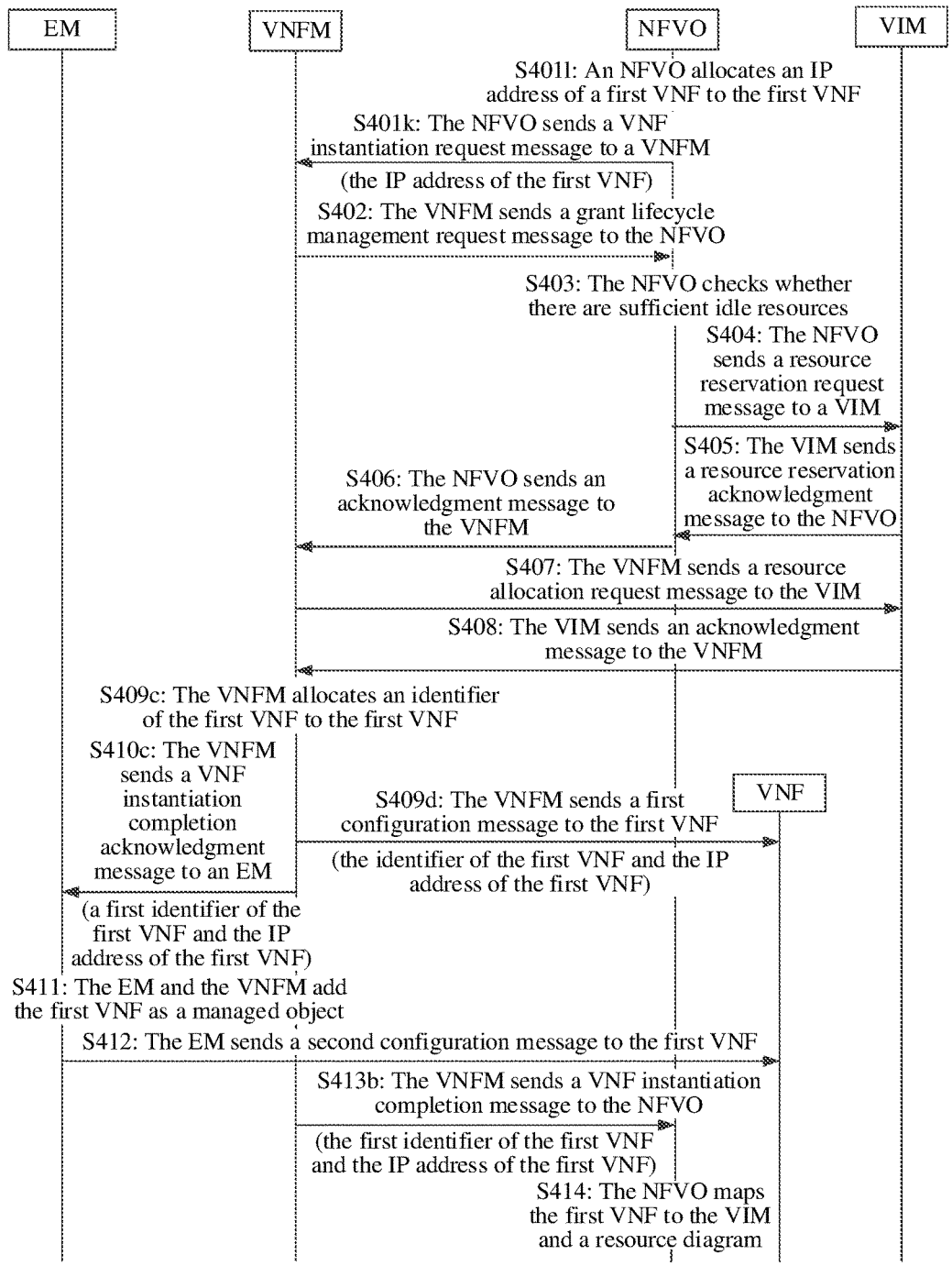
FIG. 12 is a seventh flowchart of instantiation on a first VNF according to an embodiment of the present disclosure.

An implementation manner of manner 7 is similar to an implementation manner of manner 6. With reference to FIG. 11, as shown in FIG. 12, a difference is that step S401 may further include the following steps.

S401l: The NFVO allocates an IP address of the first VNF to the first VNF.

Further, if instantiation on the first VNF is initiated by the NM, after receiving the VNF instantiation request message sent by the NM, the NFVO allocates the IP address of the first VNF to the first VNF. If instantiation on the first VNF is initiated by the NFVO, when the first VNF needs to be instantiated, the NFVO allocates the IP address of the first VNF to the first VNF.

Step S401k: The NFVO sends the VNF instantiation request message to the VNFM, where the VNF instantiation request message carries the IP address of the first VNF.

Manner 8: The EM allocates an identifier of the first VNF to the first VNF, and the VNFM allocates an IP address of the first VNF to the first VNF.

Figure 13:
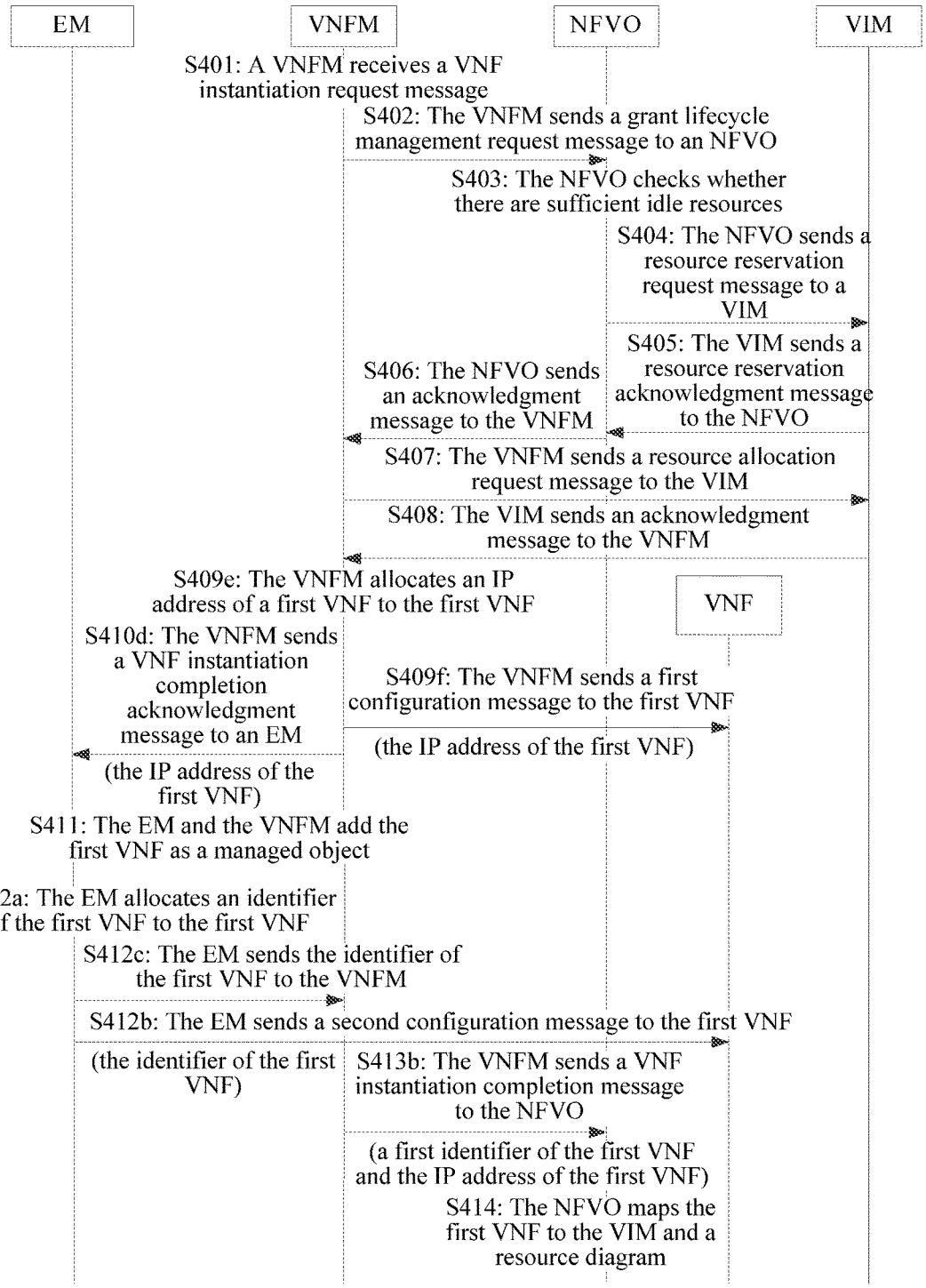
FIG. 13 is an eighth flowchart of instantiation on a first VNF according to an embodiment of the present disclosure.

In manner 8, with reference to FIG. 5, as shown in FIG. 13, step S409 includes the following steps.

Step S409e: The VNFM allocates an IP address of the first VNF to the first VNF.

Step S409f: The VNFM sends the first configuration message to the first VNF, where the first configuration message carries the IP address of the first VNF.

Further, step S410 may include the following step.

Step S410d: The VNFM sends the VNF instantiation completion acknowledgment message to the EM, where the VNF instantiation completion acknowledgment message carries the IP address of the first VNF.

Further, step S412 includes the following steps.

Step S412a: The EM allocates an identifier of the first VNF to the first VNF.

Step S412b: The EM sends the second configuration message to the first VNF, where the second configuration message carries the identifier of the first VNF.

Step S412c: The EM sends the identifier of the first VNF to the VNFM.

It should be noted that an execution sequence of steps S412b and S412c is not limited in this embodiment of the present disclosure.

Further, step S413 may include the following step.

Step S413b: The VNFM sends the VNF instantiation completion message to the NFVO, where the VNF instantiation completion message carries a first identifier of the first VNF and the IP address of the first VNF.

Manner 9: The EM allocates an identifier of the first VNF to the first VNF, and the NM allocates an IP address of the first VNF to the first VNF.

Figure 14:
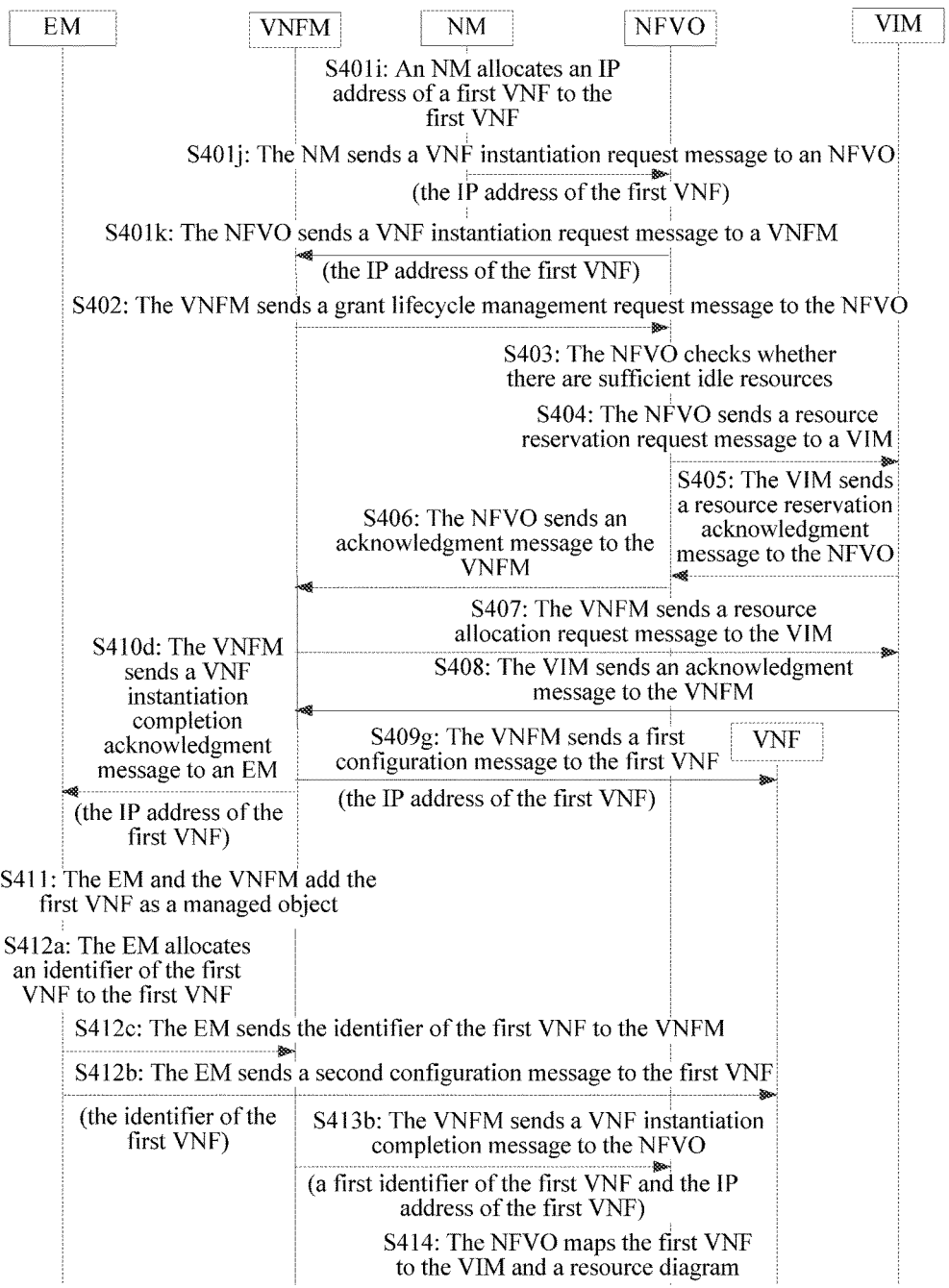
FIG. 14 is a ninth flowchart of instantiation on a first VNF according to an embodiment of the present disclosure.

In manner 9, it is assumed that instantiation on the first VNF is initiated by the NM. With reference to FIG. 5, as shown in FIG. 14, step S401 includes the following steps.

Step S401i: The NM allocates an IP address of the first VNF to the first VNF.

Step S401j: The NM sends the VNF instantiation request message to the NFVO, where the VNF instantiation request message carries the IP address of the first VNF.

Step S401k: The NFVO sends the VNF instantiation request message to the VNFM, where the VNF instantiation request message carries the IP address of the first VNF.

Further, steps S409, S410, and S413 may include the following steps.

Step S409g: The VNFM sends the first configuration message to the first VNF, where the first configuration message carries the IP address of the first VNF.

Step S410d: The VNFM sends the VNF instantiation completion acknowledgment message to the EM, where the VNF instantiation completion acknowledgment message carries the IP address of the first VNF.

Further, step S412 includes the following steps.

Step S412a: The EM allocates an identifier of the first VNF to the first VNF.

Step S412b: The EM sends the second configuration message to the first VNF, where the second configuration message carries the identifier of the first VNF.

Step S412c: The EM sends the identifier of the first VNF to the VNFM.

It should be noted that an execution sequence of steps S412b and S412c is not limited in this embodiment of the present disclosure.

Further, step S413 may include the following steps.

Step S413b: The VNFM sends the VNF instantiation completion message to the NFVO, where the VNF instantiation completion message carries a first identifier of the first VNF and the IP address of the first VNF.

Manner 10: The EM allocates an identifier of the first VNF to the first VNF, and the NFVO allocates an IP address of the first VNF to the first VNF.

Figure 15:
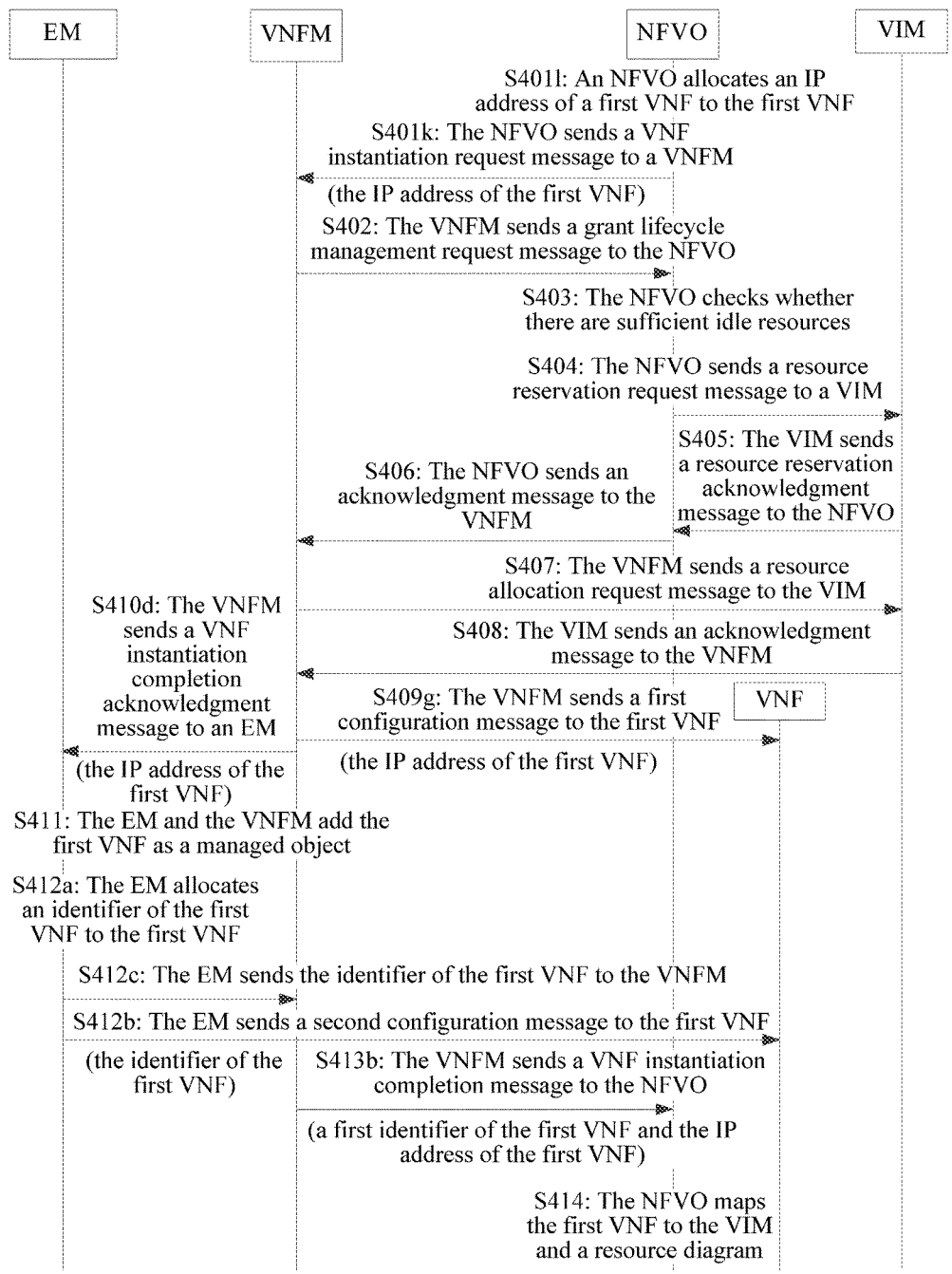
FIG. 15 is a tenth flowchart of instantiation on a first VNF according to an embodiment of the present disclosure.

Further, an implementation manner of manner 10 is similar to an implementation manner of manner 9. With reference to FIG. 14, as shown in FIG. 15, a difference is that step S401 may further include the following steps.

Step S401l: The NFVO allocates an IP address of the first VNF to the first VNF.

Step S401k: The NFVO sends the VNF instantiation request message to the VNFM, where the VNF instantiation request message carries the IP address of the first VNF.

Manner 11: The NM allocates an identifier of the first VNF to the first VNF, and the EM allocates an IP address of the first VNF to the first VNF.

Figure 16:
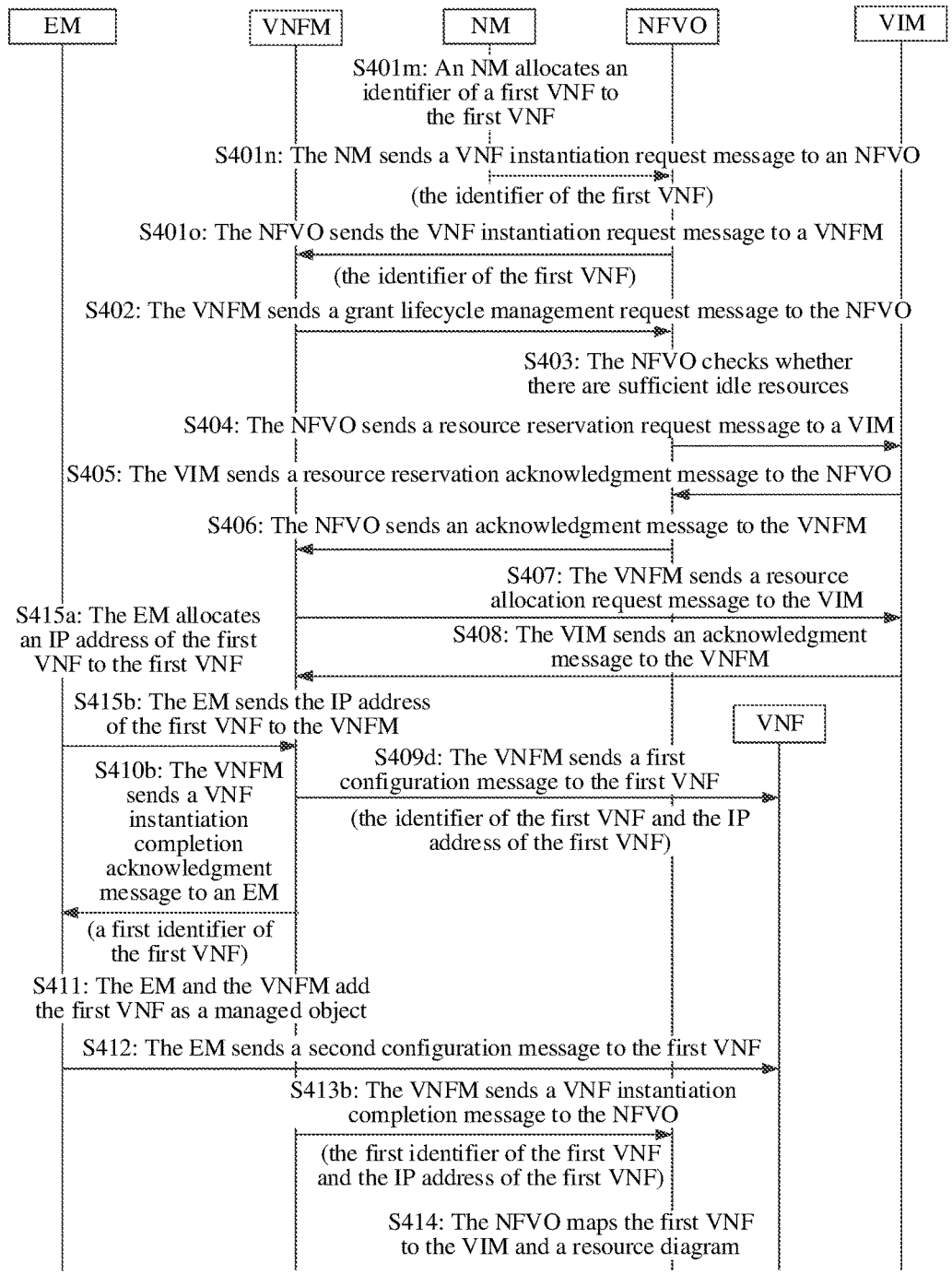
FIG. 16 is an eleventh flowchart of instantiation on a first VNF according to an embodiment of the present disclosure.

In manner 11, it is assumed that instantiation on the first VNF is initiated by the NM. With reference to FIG. 5, as shown in FIG. 16, step S401 includes the following steps.

Step S401m: The NM allocates an identifier of the first VNF to the first VNF.

Step S401n: The NM sends the VNF instantiation request message to the NFVO, where the VNF instantiation request message carries the identifier of the first VNF.

Step S401o: The NFVO sends the VNF instantiation request message to the VNFM, where the VNF instantiation request message carries the identifier of the first VNF.

Further, before step S409, the process in which the VNFM instantiates the first VNF includes the following steps.

Step S415a: The EM allocates an IP address of the first VNF to the first VNF.

Step S415b: The EM sends the IP address of the first VNF to the VNFM.

Further, steps S409, S410, and S413 may include the following steps.

Step S409d: The VNFM sends the first configuration message to the first VNF, where the first configuration message carries the identifier of the first VNF and the IP address of the first VNF.

Step S410b: The VNFM sends the VNF instantiation completion acknowledgment message to the EM, where the VNF instantiation completion acknowledgment message carries a first identifier of the first VNF.

Step S413b: The VNFM sends the VNF instantiation completion message to the NFVO, where the VNF instantiation completion message carries the first identifier of the first VNF and the IP address of the first VNF.

Manner 12: The NM allocates an identifier of the first VNF to the first VNF, and the VNFM allocates an IP address of the first VNF to the first VNF.

Figure 17:
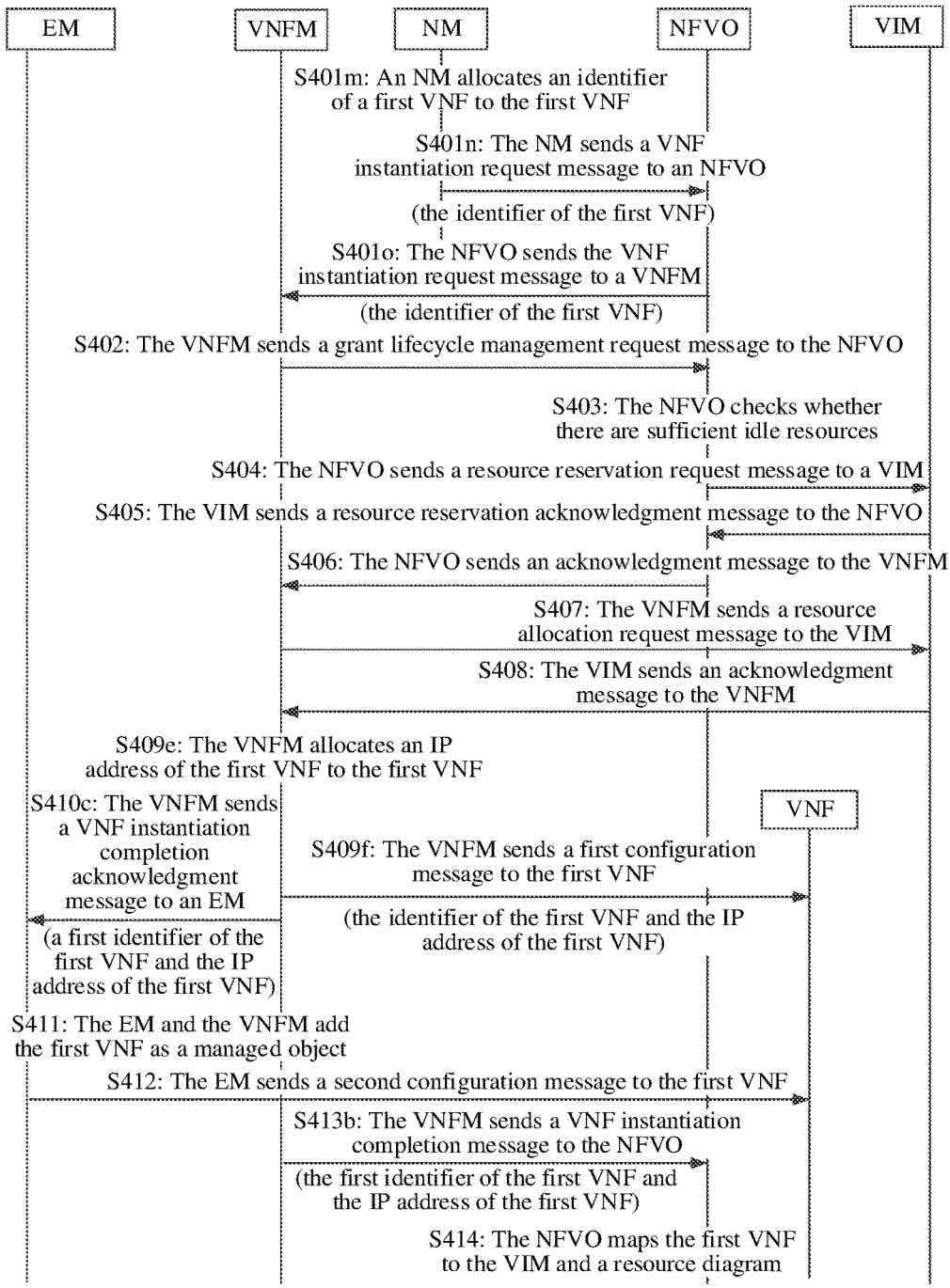
FIG. 17 is a twelfth flowchart of instantiation on a first VNF according to an embodiment of the present disclosure.

In manner 12, it is assumed that instantiation on the first VNF is initiated by the NM. With reference to FIG. 5, as shown in FIG. 17, step S401 includes the following steps.

Step S401m: The NM allocates an identifier of the first VNF to the first VNF.

Step S401n: The NM sends the VNF instantiation request message to the NFVO, where the VNF instantiation request message carries the identifier of the first VNF.

Step S401o: The NFVO sends the VNF instantiation request message to the VNFM, where the VNF instantiation request message carries the identifier of the first VNF.

Further, step S409 includes the following steps.

Step S409e: The VNFM allocates an IP address of the first VNF to the first VNF.

Step S409f: The VNFM sends the first configuration message to the first VNF, where the first configuration message carries the identifier of the first VNF and the IP address of the first VNF.

Further, steps S410 and S413 may include the following steps.

Step S410c: The VNFM sends the VNF instantiation completion acknowledgment message to the EM, where the VNF instantiation completion acknowledgment message carries a first identifier of the first VNF and the IP address of the first VNF.

Step S413b: The VNFM sends the VNF instantiation completion message to the NFVO, where the VNF instantiation completion message carries the first identifier of the first VNF and the IP address of the first VNF.

Manner 13: The NM allocates an identifier of the first VNF to the first VNF, and the NFVO allocates an IP address of the first VNF to the first VNF.

Figure 18:
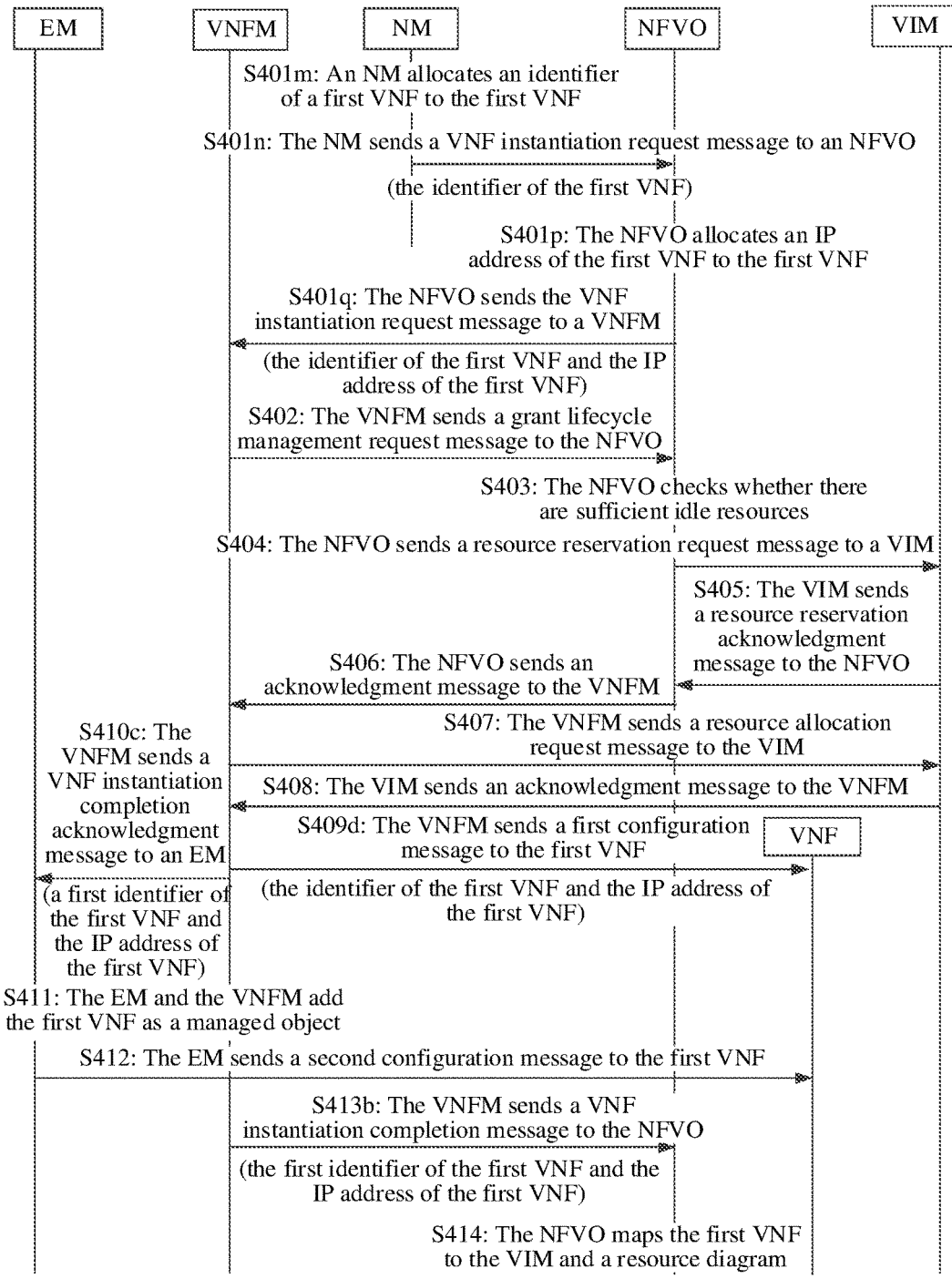
FIG. 18 is a thirteenth flowchart of instantiation on a first VNF according to an embodiment of the present disclosure.

In manner 13, instantiation on the first VNF is initiated by the NM. With reference to FIG. 5, as shown in FIG. 18, step S401 may include the following steps.

Step S401m: The NM allocates an identifier of the first VNF to the first VNF.

Step S401n: The NM sends the VNF instantiation request message to the NFVO, where the VNF instantiation request message carries the identifier of the first VNF.

Step S401p: The NFVO allocates an IP address of the first VNF to the first VNF.

Step S401q: The NFVO sends the VNF instantiation request message to the VNFM, where the VNF instantiation request message carries the identifier of the first VNF and the IP address of the first VNF.

Further, steps S409, S410, and S413 may include the following steps.

Step S409d: The VNFM sends the first configuration message to the first VNF, where the first configuration message carries the identifier of the first VNF and the IP address of the first VNF.

Step S410c: The VNFM sends the VNF instantiation completion acknowledgment message to the EM, where the VNF instantiation completion acknowledgment message carries a first identifier of the first VNF and the IP address of the first VNF.

Step S413b: The VNFM sends the VNF instantiation completion message to the NFVO, where the VNF instantiation completion message carries the first identifier of the first VNF and the IP address of the first VNF.

The first identifier of the first VNF includes the identifier of the first VNF.

Manner 14: The NFVO allocates an identifier of the first VNF to the first VNF, and the EM allocates an IP address of the first VNF to the first VNF.

Figure 19:
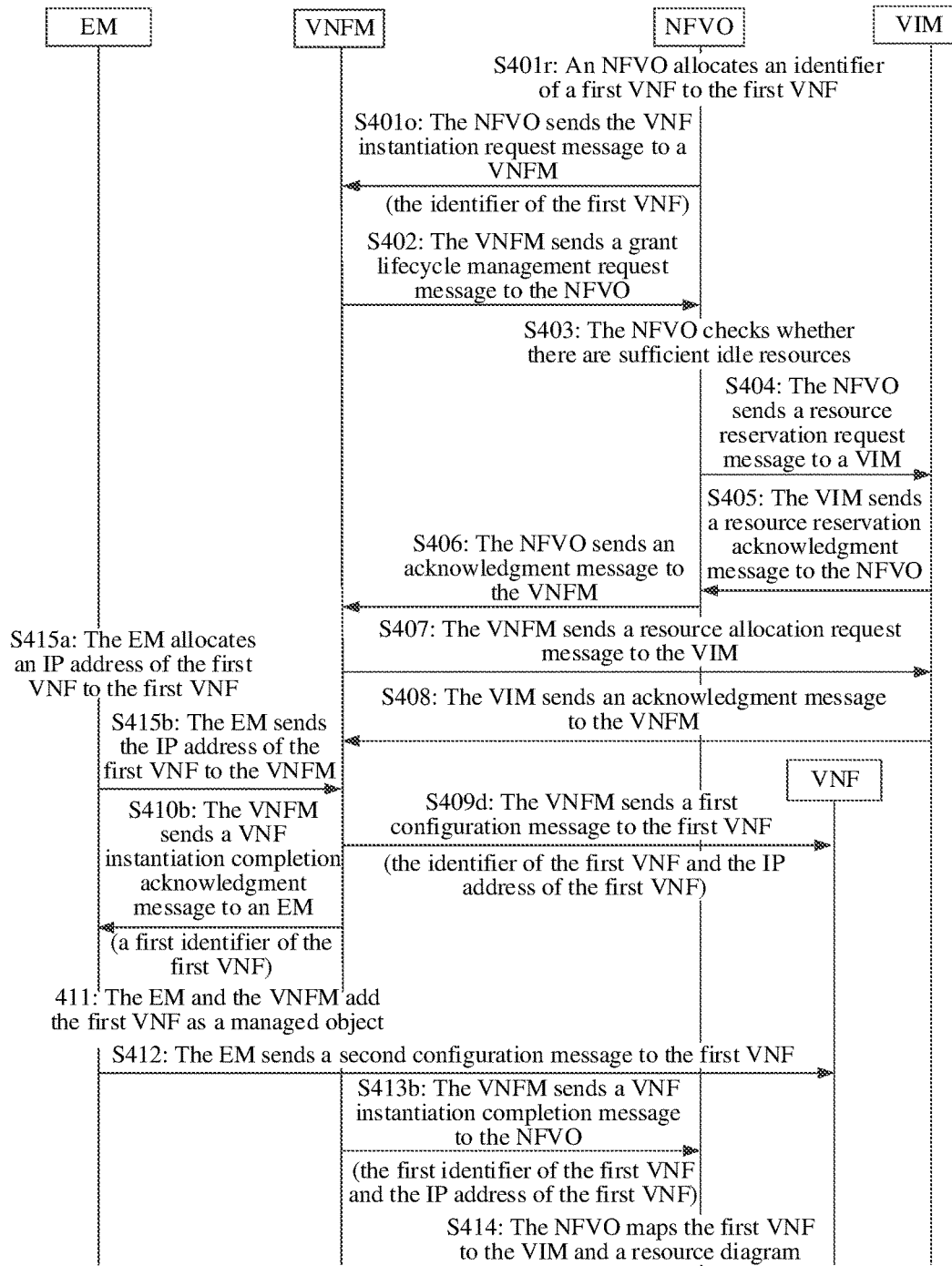
FIG. 19 is a fourteenth flowchart of instantiation on a first VNF according to an embodiment of the present disclosure.

Further, an implementation manner of manner 14 is similar to an implementation manner of manner 11. With reference to FIG. 16, as shown in FIG. 19, a difference is that step S401 includes the following steps.

Step S401r: The NFVO allocates an identifier of the first VNF to the first VNF.

Step S401o: The NFVO sends the VNF instantiation request message to the VNFM, where the VNF instantiation request message carries the identifier of the first VNF.

Manner 15: The NFVO allocates an identifier of the first VNF to the first VNF, and the VNFM allocates an IP address of the first VNF to the first VNF.

Figure 20:
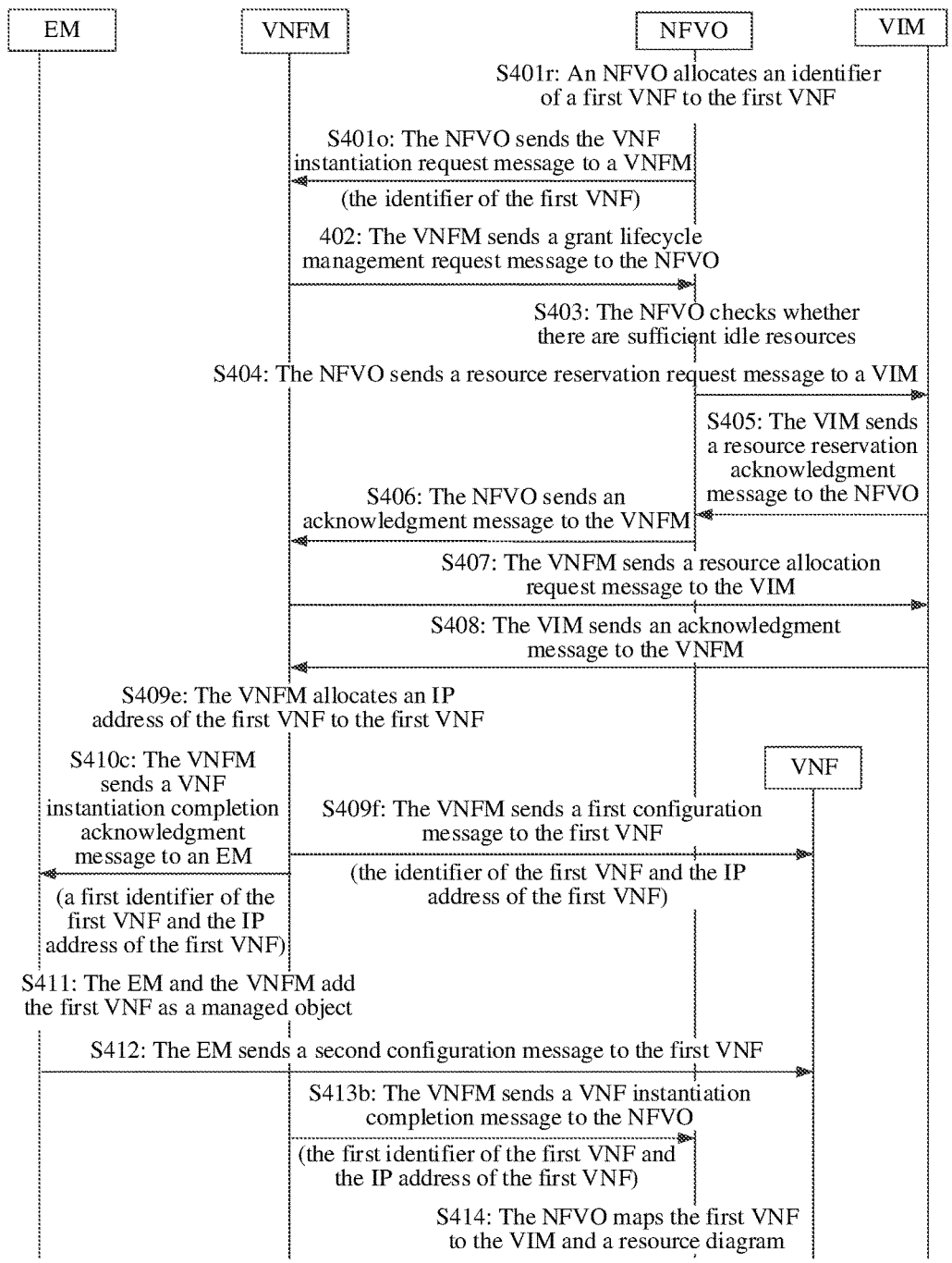
FIG. 20 is a fifteenth flowchart of instantiation on a first VNF according to an embodiment of the present disclosure.

Further, an implementation manner of manner 15 is similar to an implementation manner of manner 12. With reference to FIG. 17, as shown in FIG. 20, a difference is that step S401 includes the following steps.

Step S401r: The NFVO allocates an identifier of the first VNF to the first VNF.

Step S401o: The NFVO sends the VNF instantiation request message to the VNFM, where the VNF instantiation request message carries the identifier of the first VNF.

Manner 16: The NFVO allocates an identifier of the first VNF to the first VNF, and the NM allocates an IP address of the first VNF to the first VNF.

Figure 21:
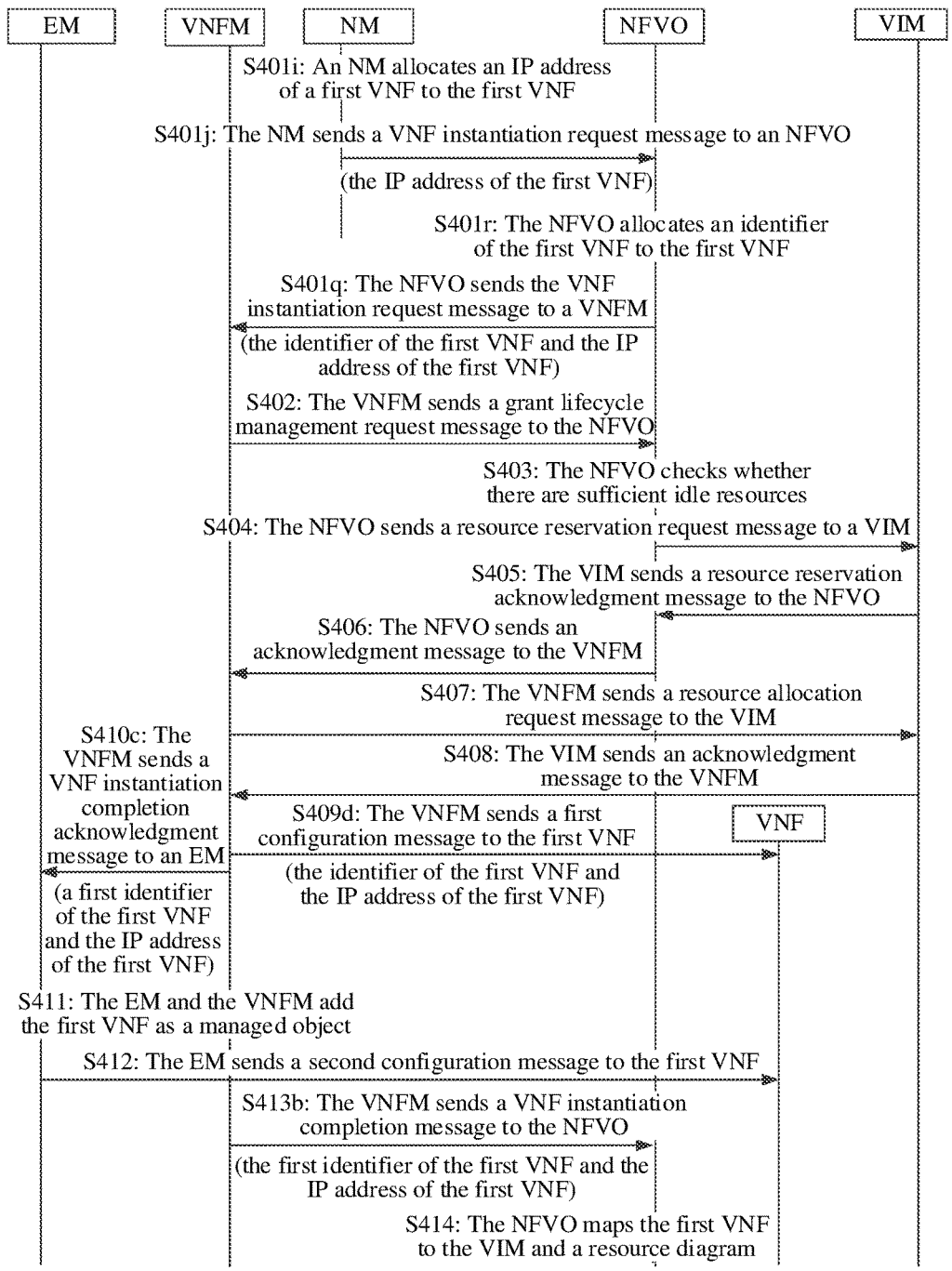
FIG. 21 is a sixteenth flowchart of instantiation on a first VNF according to an embodiment of the present disclosure.

Further, an implementation manner of manner 16 is similar to an implementation manner of manner 13. With reference to FIG. 18, as shown in FIG. 21, a difference is that step S401 includes the following steps.

Step S401i: The NM allocates an IP address of the first VNF to the first VNF.

Step S401j: The NM sends the VNF instantiation request message to the NFVO, where the VNF instantiation request message carries the IP address of the first VNF.

Step S401r: The NFVO allocates an identifier of the first VNF to the first VNF.

Step S401q: The NFVO sends the VNF instantiation request message to the VNFM, where the VNF instantiation request message carries the identifier of the first VNF and the IP address of the first VNF.

Further, in this embodiment of the present disclosure, the NM obtains, by receiving the NS instantiation completion message sent by the NFVO, the information about the N VNFs forming the first NS. The NFVO obtains the information about the N VNFs when performing instantiation for the first NS according to the NS instantiation request message sent by the NM for the first NS. To better describe the method for associating an NS with a VNF provided in this embodiment of the present disclosure, the process in which the NFVO performs instantiation for the first NS is briefly described below with reference to FIG. 21.

Figure 22:
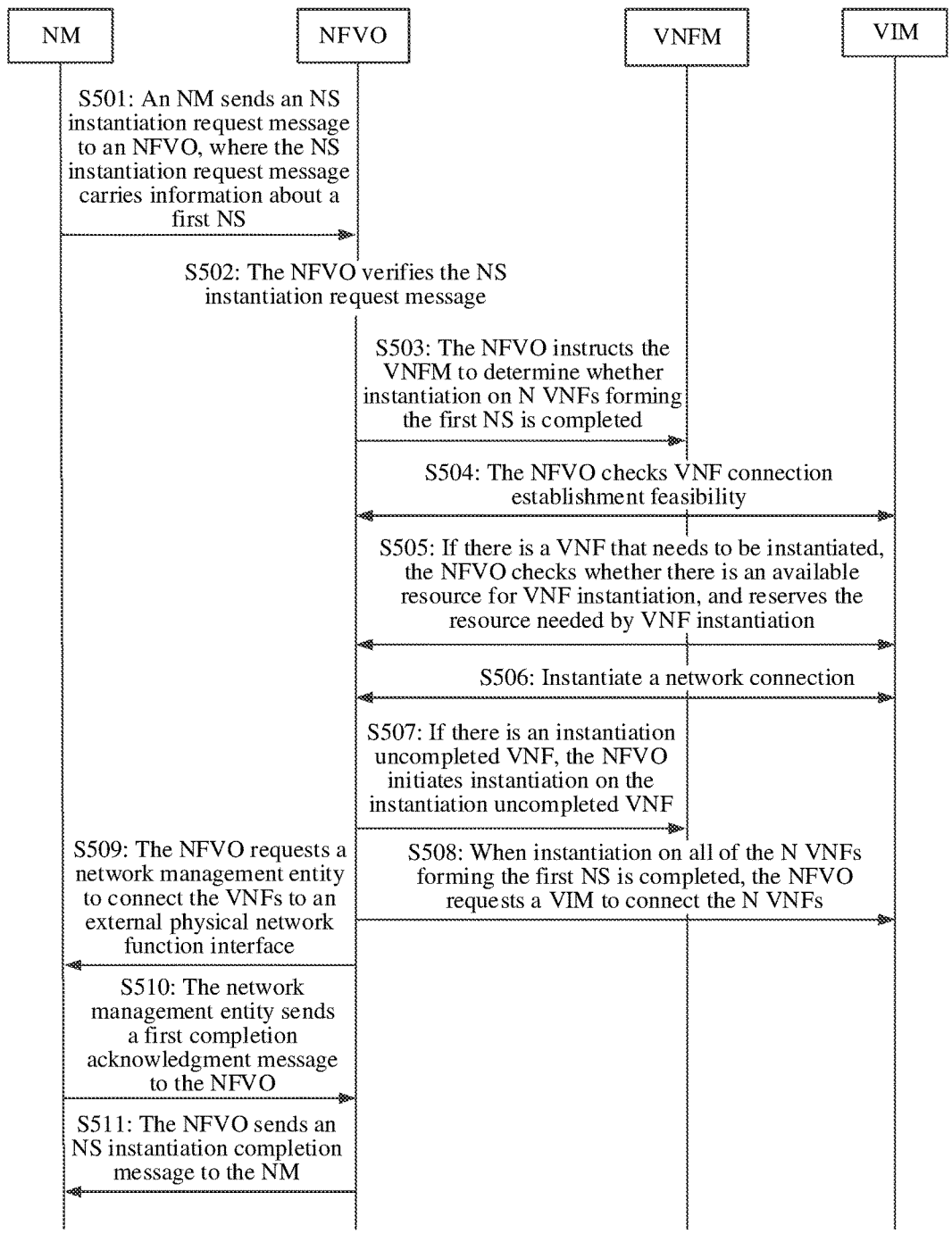
FIG. 22 is a flowchart of instantiation for a first NS according to an embodiment of the present disclosure.

As shown in FIG. 22, the process in which the NFVO performs instantiation for the first NS includes the following steps.

Step S501: The NM sends an NS instantiation request message to the NFVO, where the NS instantiation request message carries information about the first NS.

Step S502: The NFVO verifies the NS instantiation request message.

Step S503: The NFVO instructs the VNFM to determine whether instantiation on the N VNFs forming the first NS is completed.

Step S504: The NFVO checks VNF connection establishment feasibility, which includes the following steps (not shown).

Step S504a: The NFVO sends a first request message to the VIM, where the first request message is used to request the VIM to reserve a resource needed when the N VNFs are connected.

Step S504b: The VIM checks the resource needed when the N VNFs are connected, and reserves the resource needed when the N VNFs are connected.

Step S504c: The VIM sends a reservation success acknowledgment message to the NFVO.

Step S505: If there is a VNF that needs to be instantiated, the NFVO checks whether there is an available resource for VNF instantiation, and reserves the resource needed by VNF instantiation.

Step S506: Instantiate a network connection, which includes the following steps (not shown).

Step S506a: The NFVO requests the VIM to instantiate the network connection, where some of the N VNFs may be already connected, and the other VNFs need to be connected.

Step S506b: The VIM instantiates a connection needed by the first NS.

Step S506c: The VIM notifies the NFVO that connection instantiation is completed.

Step S507: If there is an instantiation uncompleted VNF, the NFVO initiates instantiation on the instantiation uncompleted VNF.

Step S508: When instantiation on all of the N VNFs forming the first NS is completed, the NFVO requests the VIM to connect the N VNFs, which includes the following steps (not shown).

Step S508a: The NFVO sends a second request message to the VIM, where the second request message is used to request the VIM to connect the N VNFs.

Step S508b: The VIM connects needed virtual deployed units to a network.

Step S508c: The VIM sends a first completion acknowledgment message to the NFVO.

Step S509: The NFVO requests a network management entity to connect the VNFs to an external physical network function interface.

The network management entity may be an NM, an EM, or a wide area network (WAN) infrastructure manager (WIM).

Step S510: The network management entity sends a first completion acknowledgment message to the NFVO.

Step S511: The NFVO sends an NS instantiation completion message to the NM.

Further, for a specific implementation manner for the process in which the NFVO performs instantiation for the first NS, refer to other implementation manner for the process in which the NFVO instantiates the first NS, and details are not described in this embodiment of the present disclosure.

It should be noted that in this embodiment of the present disclosure, according to the process in which the NFVO performs instantiation for the first NS, the NFVO may obtain, after step S503, the information about the N VNFs forming the first NS. That is, after the NFVO instructs the VNFM to determine whether instantiation on the N VNFs forming the first NS is completed, information about an NS for which instantiation is completed is obtained according to the manner used by the NFVO to obtain the information about the instantiation completed VNF in the N VNFs in the embodiment shown in FIG. 4. In addition, with reference to step S507, that is, if there is an instantiation uncompleted VNF, the NFVO initiates instantiation on the instantiation uncompleted VNF. When instantiating the instantiation uncompleted VNF, the NFVO obtains information about the instantiation uncompleted VNF according to the methods in the embodiments shown in FIG. 6 to FIG. 21 provided in this embodiment of the present disclosure. In this way, the NFVO obtains the information about the N VNFs.

This embodiment of the present disclosure provides a method for associating an NS with a VNF. Further, an NM sends an NS instantiation request message to an NFVO, receives an NS instantiation completion message sent by the NFVO, and determines a mapping relationship between a first NS and N VNFs according to information about the first NS and information about the N VNFs. The NS instantiation request message carries the information about the first NS, and the NS instantiation request message is used to request the NFVO to perform instantiation for the first NS. The NS instantiation completion message is used to indicate that instantiation for the first NS is completed, and the NS instantiation completion message carries the information about the first NS and the information about the N VNFs. Information about each VNF in the information about the N VNFs is used to represent the VNF in the N VNFs forming the first NS, and N≥1. By means of the method, the NM may obtain an identifier of the first NS and the information about the N VNFs forming the first NS, and determine the mapping relationship between the first NS and the N VNFs according to the identifier of the first NS and the information about the N VNFs. Therefore, the NM can determine the N VNFs forming the first NS, and maintain the first NS.

Embodiment 3

Figure 23:
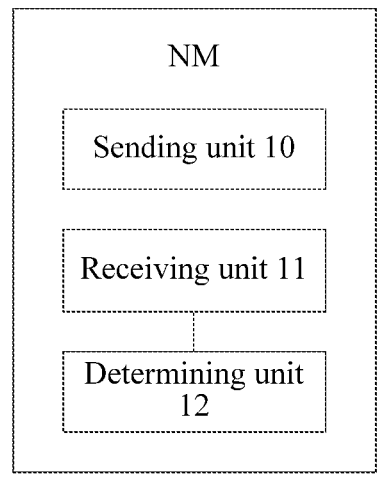
FIG. 23 is a first schematic structural diagram of an NM according to an embodiment of the present disclosure.

As shown in FIG. 23, this embodiment of the present disclosure provides an NM. The NM may include a sending unit 10 configured to send an NS instantiation request message to an NFVO, where the NS instantiation request message carries information about a first NS, and the NS instantiation request message is used to request the NFVO to perform instantiation for the first NS, a receiving unit 11 configured to receive an NS instantiation completion message sent by the NFVO, where the NS instantiation completion message is used to indicate that instantiation for the first NS is completed, the NS instantiation completion message carries the information about the first NS and information about N VNFs, information about each VNF in the information about the N VNFs is used to represent the VNF in the N VNFs forming the first NS, and N≥1, and a determining unit 12 configured to determine a mapping relationship between the first NS and the N VNFs according to the information about the first NS and the information about the N VNFs that are received by the receiving unit 11.

Optionally, the information about each VNF received by the receiving unit 11 includes at least one of an IP address of the VNF represented by the information about the VNF or a first identifier of the VNF, where the IP address of the VNF is used to uniquely represent the VNF, and the first identifier of the VNF is used to uniquely represent the VNF.

Optionally, the first identifier of the VNF received by the receiving unit 11 includes at least an identifier of the VNF.

Optionally, the first identifier of the VNF received by the receiving unit 11 further includes an identifier of a VNFM, or the identifier of the VNFM and an identifier of the NFVO, where the VNFM is connected to the VNF.

Optionally, the identifier of the VNF received by the receiving unit 11 is allocated to the VNF by the NFVO, the NM, an EM, or the VNFM connected to the VNF.

Optionally, the IP address of the VNF received by the receiving unit 11 is allocated to the VNF by the NFVO, the NM, the EM, or the VNFM connected to the VNF.

Optionally, the information about the first NS received by the receiving unit 11 includes instantiation information of the first NS. The determining unit 12 is further configured to determine the mapping relationship between the first NS and the N VNFs according to the instantiation information of the first NS and the information about the N VNFs.

Optionally, the information about the first NS received by the receiving unit 11 includes instantiation information of the first NS and an identifier of the first NS. The determining unit 12 is further configured to determine the mapping relationship between the first NS and the N VNFs according to the identifier of the first NS and the information about the N VNFs, or determine the mapping relationship between the first NS and the N VNFs according to the instantiation information of the first NS, the identifier of the first NS, and the information about the N VNFs.

Figure 24:
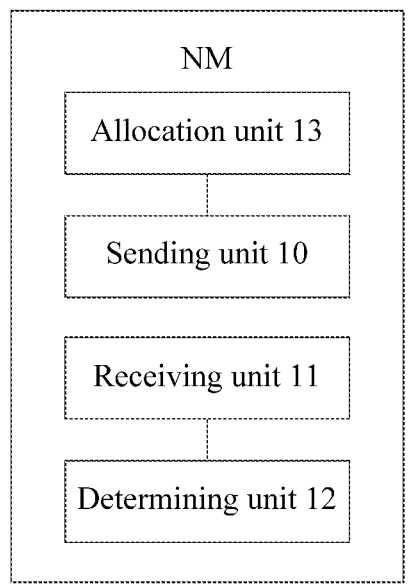
FIG. 24 is a second schematic structural diagram of an NM according to an embodiment of the present disclosure.

Optionally, with reference to FIG. 23, as shown in FIG. 24, the NM further includes an allocation unit 13. The allocation unit 13 is configured to allocate the identifier of the first NS to the first NS before the sending unit 10 sends the NS instantiation request message to the NFVO.

Optionally, the information about the first NS received by the receiving unit 11 includes instantiation information of the first NS. The determining unit 12 is further configured to allocate an identifier of the first NS to the first NS according to the instantiation information of the first NS, and determine the mapping relationship between the first NS and the N VNFs according to the identifier of the first NS and the information about the N VNFs, or determine the mapping relationship between the first NS and the N VNFs according to the instantiation information of the first NS, the identifier of the first NS, and the information about the N VNFs.

The NM provided in this embodiment of the present disclosure can send an NS instantiation request message to an NFVO, receive an NS instantiation completion message sent by the NFVO, and determine a mapping relationship between a first NS and N VNFs according to information about the first NS and information about the N VNFs. The NS instantiation request message carries the information about the first NS, and the NS instantiation request message is used to request the NFVO to perform instantiation for the first NS. The NS instantiation completion message is used to indicate that instantiation for the first NS is completed, and the NS instantiation completion message carries the information about the first NS and the information about the N VNFs. Information about each VNF in the information about the N VNFs is used to represent the VNF in the N VNFs forming the first NS, and N≥1. The NM provided in this embodiment may obtain an identifier of the first NS and the information about the N VNFs forming the first NS, and determine the mapping relationship between the first NS and the N VNFs according to the identifier of the first NS and the information about the N VNFs. Therefore, the NM can determine the N VNFs forming the first NS, and maintain the first NS.

Figure 25:
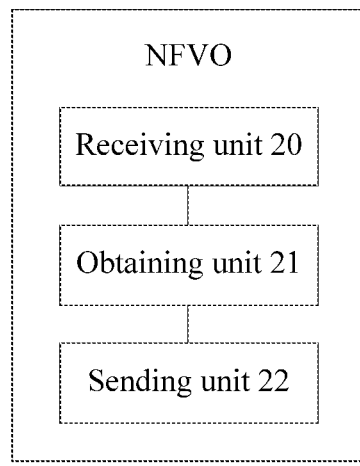
FIG. 25 is a first schematic structural diagram of an NFVO according to an embodiment of the present disclosure.

As shown in FIG. 25, this embodiment of the present disclosure provides an NFVO. The NFVO may include a receiving unit 20 configured to receive an NS instantiation request message sent by an NM, where the NS instantiation request message carries information about a first NS, and the NS instantiation request message is used to request the NFVO to perform instantiation for the first NS, an obtaining unit 21 configured to obtain, according to the information about the first NS received by the receiving unit 20, information about N VNFs forming the first NS, where information about each VNF in the information about the N VNFs is used to represent the VNF in the N VNFs, and N≥1, and a sending unit 22 configured to send an NS instantiation completion message to the NM, where the NS instantiation completion message is used to indicate that instantiation for the first NS is completed, the NS instantiation completion message carries the information about the first NS received by the receiving unit 20 and the information about the N VNFs obtained by the obtaining unit 21, and the information about the first NS and the information about the N VNFs are used by the NM to determine a mapping relationship between the first NS and the N VNFs.

Figure 26:
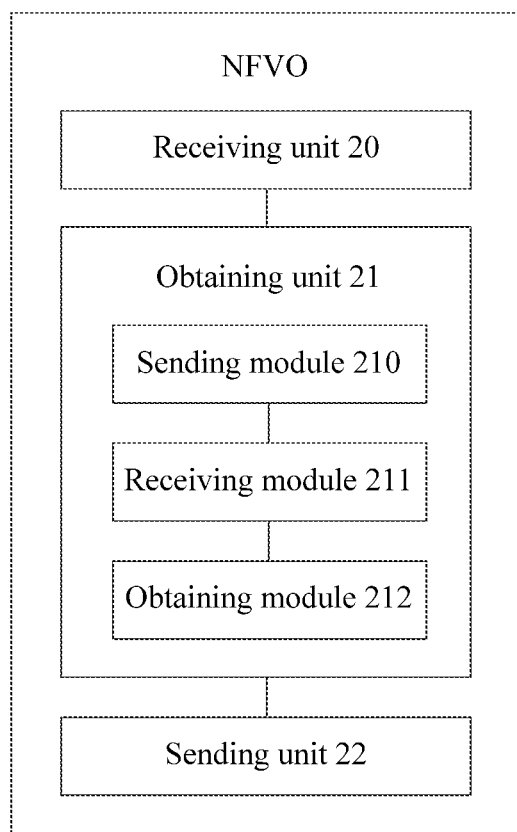
FIG. 26 is a second schematic structural diagram of an NFVO according to an embodiment of the present disclosure.

Optionally, the information about the first NS received by the receiving unit 20 includes instantiation information of the first NS, where the instantiation information of the first NS includes instantiation information of the N VNFs. With reference to FIG. 25, as shown in FIG. 26, the obtaining unit 21 includes a sending module 210, a receiving module 211, and an obtaining module 212.

The sending module 210 is configured to send a search indication message to a VNFM, where the search indication message carries the instantiation information of the first NS, and the search indication message is used to instruct the VNFM to search for the N VNFs according to the instantiation information of the first NS.

The receiving module 211 is configured to receive a search response message that is sent by the VNFM and that corresponds to the search indication message sent by the sending module 210, where the search response message is used to determine an instantiation completed VNF and an instantiation uncompleted VNF in the N VNFs.

The obtaining module 212 is configured to obtain information about the instantiation completed VNF in the N VNFs and information about the instantiation uncompleted VNF in the N VNFs according to the search response message received by the receiving module 211.

Optionally, the obtaining module 212 is further configured to obtain, according to the search response message, the information about the instantiation completed VNF in the N VNFs from VNF information saved in the NFVO, or obtain the information about the instantiation completed VNF in the N VNFs from the search response message.

Optionally, the obtaining module 212 is further configured to send at least one VNF instantiation request message to the VNFM according to the search response message, and receive at least one VNF instantiation completion message that is sent by the VNFM and that corresponds to the at least one VNF instantiation request message, where the at least one VNF instantiation request message is used to request the VNFM to instantiate the instantiation uncompleted VNF in the N VNFs, and the at least one VNF instantiation completion message carries the information about the instantiation uncompleted VNF in the N VNFs.

Optionally, the information about each VNF obtained by the obtaining unit 21 includes at least one of an IP address of the VNF represented by the information about the VNF or a first identifier of the VNF, where the IP address of the VNF is used to uniquely represent the VNF, and the first identifier of the VNF is used to uniquely represent the VNF.

Optionally, the first identifier of the VNF obtained by the obtaining unit 21 includes at least an identifier of the VNF.

Optionally, the first identifier of the VNF obtained by the obtaining unit 21 further includes an identifier of the VNFM, or the identifier of the VNFM and an identifier of the NFVO, where the VNFM is connected to the VNF.

Optionally, the identifier of the VNF obtained by the obtaining unit 21 is allocated to the VNF by the NFVO, the NM, an EM, or the VNFM connected to the VNF.

Optionally, the IP address of the VNF obtained by the obtaining unit 21 is allocated to the VNF by the NFVO, the NM, the EM, or the VNFM connected to the VNF.

The NFVO provided in this embodiment of the present disclosure can receive an NS instantiation request message sent by an NM, obtain, according to the NS instantiation request message, information about N VNFs forming a first NS, and send an NS instantiation completion message to the NM. The NS instantiation request message carries information about the first NS, and the NS instantiation request message is used to request the NFVO to perform instantiation for the first NS. Information about each VNF in the information about the N VNFs is used to represent the VNF in the N VNFs, and N≥1. The NS instantiation completion message is used to indicate that instantiation for the first NS is completed, and the NS instantiation completion message carries the information about the first NS and the information about the N VNFs. The information about the first NS and the information about the N VNFs are used by the NM to determine a mapping relationship between the first NS and the N VNFs. The NFVO provided in this embodiment of the present disclosure can obtain, according to the information about the first NS that is carried in the NS instantiation request message sent by the NM, the information about the N VNFs forming the first NS, and send the information about the first NS and the information about the N VNFs to the NM such that the NM determines the mapping relationship between the first NS and the N VNFs according to the information about the first NS and the information about the N VNFs. Therefore, the NM can determine the N VNFs forming the first NS, and maintain the first NS.

Embodiment 4

Figure 27:
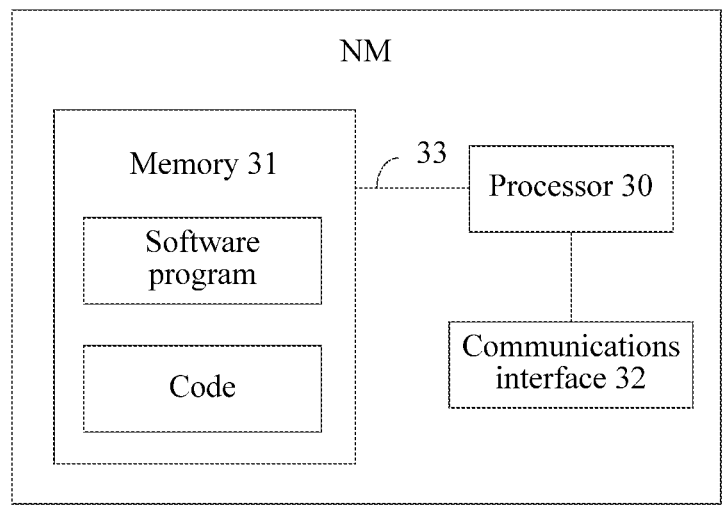
FIG. 27 is a schematic hardware structural diagram of an NM according to an embodiment of the present disclosure.

As shown in FIG. 27, this embodiment of the present disclosure provides an NM. The NM may include a processor 30, a memory 31, a communications interface 32, and a system bus 33. The processor 30, the memory 31, and the communications interface 32 are connected and implement mutual communication using the system bus 33.

The processor 30 may be a central processing unit (CPU) or an application-specific integrated circuit (ASIC), or may be configured as one or more integrated circuits configured to implement the embodiments of the present disclosure.

The memory 31 may include a volatile memory, for example, a random-access memory (RAM). Alternatively, the memory 31 may include a non-volatile memory, for example, a read-only memory (ROM), a flash memory, a hard disk drive (HDD), or a solid-state drive (SSD). Alternatively, the memory 31 may include a combination of the foregoing memories.

The communications interface 32 is configured to interact with another node, for example, interact with an NFVO.

When the NM runs, the processor 30 and the memory 31 may execute the method procedure in FIG. 2 or the method procedures in FIG. 4 to FIG. 22. Details are as follows.

The processor 30 is configured to send an NS instantiation request message to the NFVO using the communications interface 32, receive, using the communications interface 32, an NS instantiation completion message sent by the NFVO, and determine a mapping relationship between a first NS and N VNFs according to information about the first NS and information about the N VNFs. The NS instantiation request message carries the information about the first NS, and the NS instantiation request message is used to request the NFVO to perform instantiation for the first NS. The NS instantiation completion message is used to indicate that instantiation for the first NS is completed, and the NS instantiation completion message carries the information about the first NS and the information about the N VNFs. Information about each VNF in the information about the N VNFs is used to represent the VNF in the N VNFs forming the first NS, and N≥1. The memory 31 is configured to store the NS instantiation request message, the information about the first NS, the information about the N VNFs, and the NS instantiation completion message, and store a software program used by the processor 30 to complete the foregoing process such that the processor 30 executes the software program and invokes the NS instantiation request message, the information about the first NS, the information about the N VNFs, and the NS instantiation completion message to complete the foregoing process.

Optionally, the information about each VNF received by the processor 30 using the communications interface 32 includes at least one of an IP address of the VNF represented by the information about the VNF or a first identifier of the VNF, where the IP address of the VNF is used to uniquely represent the VNF, and the first identifier of the VNF is used to uniquely represent the VNF.

Optionally, the first identifier of the VNF received by the processor 30 using the communications interface 32 includes at least an identifier of the VNF.

Optionally, the first identifier of the VNF received by the processor 30 using the communications interface 32 further includes an identifier of a VNFM, or the identifier of the VNFM and an identifier of the NFVO, where the VNFM is connected to the VNF.

Optionally, the identifier of the VNF received by the processor 30 using the communications interface 32 is allocated to the VNF by the NFVO, the NM, an EM, or the VNFM connected to the VNF.

Optionally, the IP address of the VNF received by the processor 30 using the communications interface 32 is allocated to the VNF by the NFVO, the NM, the EM, or the VNFM connected to the VNF.

Optionally, the information about the first NS received by the processor 30 using the communications interface 32 includes instantiation information of the first NS. The processor 30 is further configured to determine the mapping relationship between the first NS and the N VNFs according to the instantiation information of the first NS and the information about the N VNFs.

Optionally, the information about the first NS received by the processor 30 using the communications interface 32 includes instantiation information of the first NS and an identifier of the first NS, and the processor 30 is further configured to determine the mapping relationship between the first NS and the N VNFs according to the identifier of the first NS and the information about the N VNFs, or determine the mapping relationship between the first NS and the N VNFs according to the instantiation information of the first NS, the identifier of the first NS, and the information about the N VNFs.

Optionally, the processor 30 is further configured to allocate the identifier of the first NS to the first NS before sending the NS instantiation request message to the NFVO using the communications interface 32.

Optionally, the information about the first NS received by the processor 30 using the communications interface 32 includes instantiation information of the first NS, and the processor 30 is further configured to allocate an identifier of the first NS to the first NS according to the instantiation information of the first NS, and determine the mapping relationship between the first NS and the N VNFs according to the identifier of the first NS and the information about the N VNFs, or determine the mapping relationship between the first NS and the N VNFs according to the instantiation information of the first NS, the identifier of the first NS, and the information about the N VNFs.

The NM provided in this embodiment of the present disclosure can send an NS instantiation request message to an NFVO, receive an NS instantiation completion message sent by the NFVO, and determine a mapping relationship between a first NS and N VNFs according to information about the first NS and information about the N VNFs. The NS instantiation request message carries the information about the first NS, and the NS instantiation request message is used to request the NFVO to perform instantiation for the first NS. The NS instantiation completion message is used to indicate that instantiation for the first NS is completed, and the NS instantiation completion message carries the information about the first NS and the information about the N VNFs. Information about each VNF in the information about the N VNFs is used to represent the VNF in the N VNFs forming the first NS, and N≥1. The NM provided in this embodiment may obtain an identifier of the first NS and the information about the N VNFs forming the first NS, and determine the mapping relationship between the first NS and the N VNFs according to the identifier of the first NS and the information about the N VNFs. Therefore, the NM can determine the N VNFs forming the first NS, and maintain the first NS.

Figure 28:
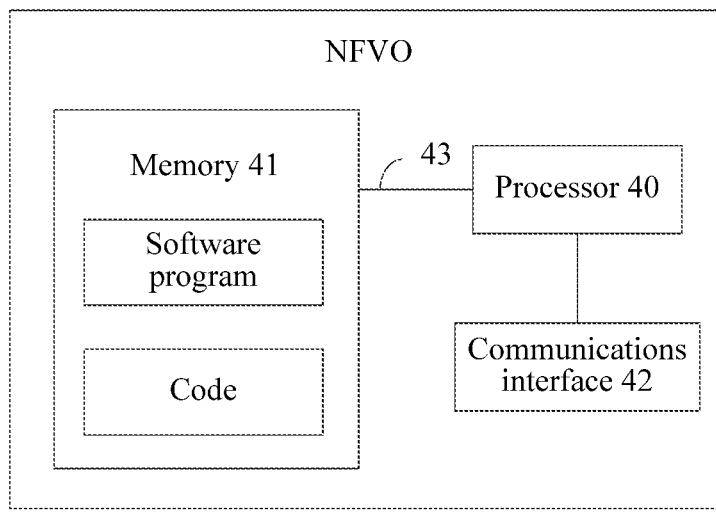
FIG. 28 is a schematic hardware structural diagram of an NFVO according to an embodiment of the present disclosure.

As shown in FIG. 28, this embodiment of the present disclosure provides an NFVO. The NFVO may include a processor 40, a memory 41, a communications interface 42, and a system bus 43. The processor 40, the memory 41, and the communications interface 42 are connected and implement mutual communication using the system bus 43.

The processor 40 may be a CPU or an ASIC, or may be configured as one or more integrated circuits configured to implement the embodiments of the present disclosure.

The memory 41 may include a volatile memory, for example, a RAM. Alternatively, the memory 41 may include a non-volatile the memory, for example, a ROM, a flash memory, an HDD, or an SSD. Alternatively, the memory 41 may include a combination of the foregoing memories.

The communications interface 42 is configured to interact with another node, for example, interact with an NM, or interact with a VNFM.

When the NFVO runs, the processor 40 and the memory 41 may execute the method procedures in FIG. 3 to FIG. 22. Details are as follows.

The processor 40 is configured to receive, using the communications interface 42, an NS instantiation request message sent by the NM, obtain, according to information about a first NS, information about N VNFs forming the first NS, and send an NS instantiation completion message to the NM using the communications interface 42. The NS instantiation request message carries the information about the first NS, and the NS instantiation request message is used to request the NFVO to perform instantiation for the first NS. Information about each VNF in the information about the N VNFs is used to represent the VNF in the N VNFs, and N≥1. The NS instantiation completion message is used to indicate that instantiation for the first NS is completed, and the NS instantiation completion message carries the information about the first NS and the information about the N VNFs. The information about the first NS and the information about the N VNFs are used by the NM to determine a mapping relationship between the first NS and the N VNFs. The memory 41 is configured to store the NS instantiation request message, the information about the first NS, the information about the N VNFs, and the NS instantiation completion message, and store a software program used by the processor 40 to complete the foregoing process such that the processor 40 executes the software program and invokes the NS instantiation request message, the information about the first NS, the information about the N VNFs, and the NS instantiation completion message to complete the foregoing process.

Optionally, the information about the first NS received by the processor 40 using the communications interface 42 includes instantiation information of the first NS, where the instantiation information of the first NS includes instantiation information of the N VNFs, and the processor 40 is further configured to send a search indication message to the VNFM using the communications interface 42, receive, using the communications interface 42, a search response message that is sent by the VNFM and that corresponds to the search indication message, and obtain information about an instantiation completed VNF in the N VNFs and information about an instantiation uncompleted VNF in the N VNFs according to the search response message. The search indication message carries the instantiation information of the first NS, and the search indication message is used to instruct the VNFM to search for the N VNFs according to the instantiation information of the first NS. The search response message is used to determine the instantiation completed VNF and the instantiation uncompleted VNF in the N VNFs.

Optionally, the processor 40 is further configured to obtain, according to the search response message, the information about the instantiation completed VNF in the N VNFs from VNF information saved in the NFVO, or obtain the information about the instantiation completed VNF in the N VNFs from the search response message.

Optionally, the processor 40 is further configured to send at least one VNF instantiation request message to the VNFM according to the search response message using the communications interface 42, and receive, using the communications interface 42, at least one VNF instantiation completion message that is sent by the VNFM and that corresponds to the at least one VNF instantiation request message, where the at least one VNF instantiation request message is used to request the VNFM to instantiate the instantiation uncompleted VNF in the N VNFs, and the at least one VNF instantiation completion message carries the information about the instantiation uncompleted VNF in the N VNFs.

Optionally, the information about each VNF obtained by the processor 40 includes at least one of an IP address of the VNF represented by the information about the VNF or a first identifier of the VNF, where the IP address of the VNF is used to uniquely represent the VNF, and the first identifier of the VNF is used to uniquely represent the VNF.

Optionally, the first identifier of the VNF obtained by the processor 40 includes at least an identifier of the VNF.

Optionally, the first identifier of the VNF obtained by the processor 40 further includes an identifier of the VNFM, or the identifier of the VNFM and an identifier of the NFVO, where the VNFM is connected to the VNF.

Optionally, the identifier of the VNF obtained by the processor 40 is allocated to the VNF by the NFVO, the NM, an EM, or the VNFM connected to the VNF.

Optionally, the IP address of the VNF obtained by the processor 40 is allocated to the VNF by the NFVO, the NM, the EM, or the VNFM connected to the VNF.

The NFVO provided in this embodiment of the present disclosure can receive an NS instantiation request message sent by an NM, obtain, according to the NS instantiation request message, information about N VNFs forming a first NS, and send an NS instantiation completion message to the NM. The NS instantiation request message carries information about the first NS, and the NS instantiation request message is used to request the NFVO to perform instantiation for the first NS. Information about each VNF in the information about the N VNFs is used to represent the VNF in the N VNFs, and N≥1. The NS instantiation completion message is used to indicate that instantiation for the first NS is completed, and the NS instantiation completion message carries the information about the first NS and the information about the N VNFs. The information about the first NS and the information about the N VNFs are used by the NM to determine a mapping relationship between the first NS and the N VNFs. The NFVO provided in this embodiment of the present disclosure can obtain, according to the information about the first NS that is carried in the NS instantiation request message sent by the NM, the information about the N VNFs forming the first NS, and send the information about the first NS and the information about the N VNFs to the NM such that the NM determines the mapping relationship between the first NS and the N VNFs according to the information about the first NS and the information about the N VNFs. Therefore, the NM can determine the N VNFs forming the first NS, and maintain the first NS.

Embodiment 5

Figure 29:
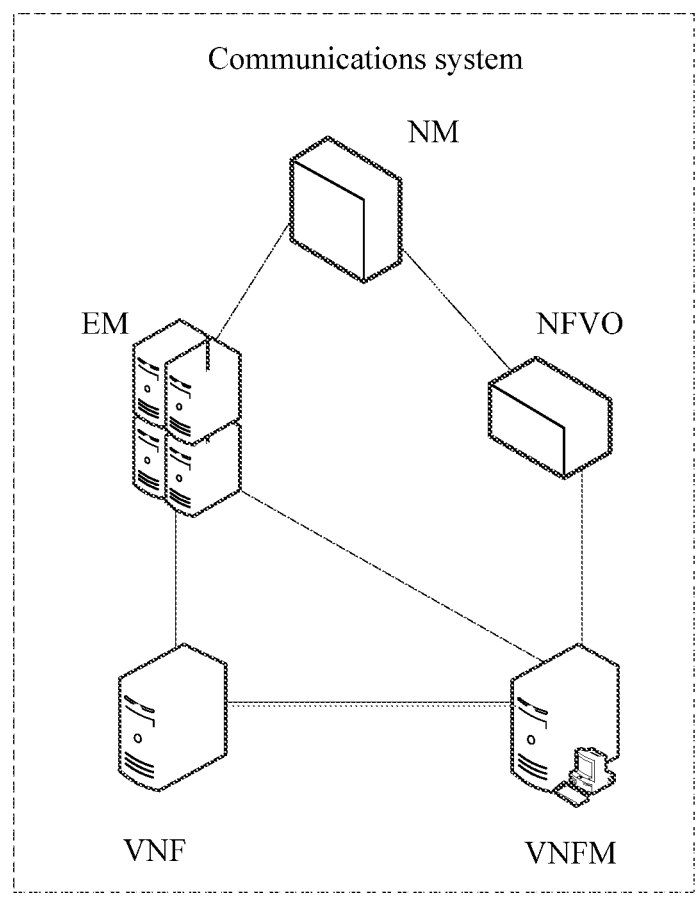
FIG. 29 is a block diagram of a communications system according to an embodiment of the present disclosure.

As shown in FIG. 29, this embodiment of the present disclosure provides a communications system. The communications system includes any one of the NMs described in Embodiment 3, any one of the NFVOs described in Embodiment 3, an EM connected to the NM, a VNFM connected to the NFVO, and N VNFs connected to both the VNFM and the EM. The EM is connected to the VNFM, and N≥1. Alternatively, the communications system provided in this embodiment of the present disclosure includes any one of the NMs described in Embodiment 4, any one of the NFVOs described in Embodiment 4, an EM connected to the NM, a VNFM connected to the NFVO, and N VNFs connected to both the VNFM and the EM. The EM is connected to the VNFM, and N≥1.

In the communications system provided in this embodiment of the present disclosure, the NM can send an NS instantiation request message to the NFVO, receive an NS instantiation completion message sent by the NFVO, and determine a mapping relationship between a first NS and the N VNFs according to information about the first NS and information about the N VNFs. The NFVO can receive the NS instantiation request message sent by NM, obtain, according to the NS instantiation request message, the information about the N VNFs forming the first NS, and send the NS instantiation completion message to the NM. The NS instantiation request message carries the information about the first NS, and the NS instantiation request message is used to request the NFVO to perform instantiation for the first NS. Information about each VNF in the information about the N VNFs is used to represent the VNF in the N VNFs, and N≥1. The NS instantiation completion message is used to indicate that instantiation for the first NS is completed, and the NS instantiation completion message carries the information about the first NS and the information about the N VNFs. The information about the first NS and the information about the N VNFs are used by the NM to determine the mapping relationship between the first NS and the N VNFs.

By means of the communications system provided in this embodiment of the present disclosure, the NM can send the NS instantiation request message to the NFVO. After receiving the NS instantiation request message, the NFVO can obtain, according to the information about the first NS that is carried in the NS instantiation request message sent by the NM, the information about the N VNFs forming the first NS, add the information about the first NS and the information about the N VNFs to the NS instantiation completion message, and send the NS instantiation completion message to the NM such that after the NM receives the NS instantiation completion message, the NM can determine the mapping relationship between the first NS and the N VNFs according to the information about the first NS and the information about the N VNFs. Therefore, the NM can determine the N VNFs forming the first NS, and maintain the first NS.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described again herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

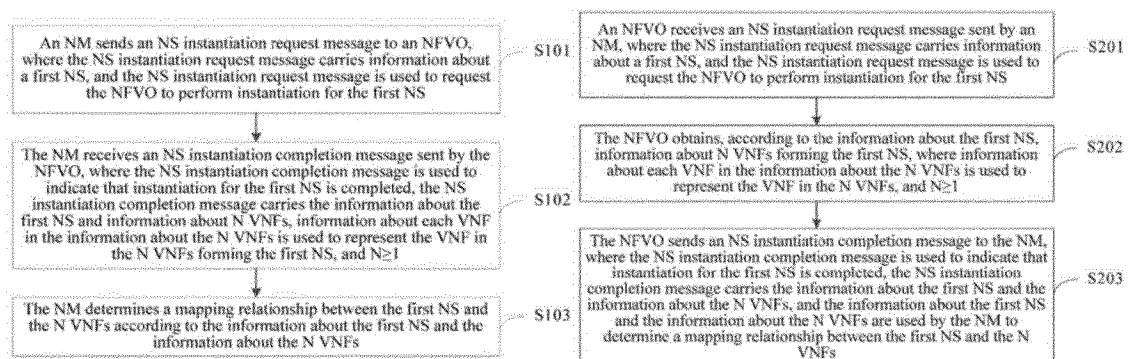

What is claimed is:

1. A method, comprising:
sending, by a network manager (NM), a network service (NS) instantiation request message to a network function virtualization orchestrator (NFVO), wherein the NS instantiation request message comprises information about an NS, and wherein the NS instantiation request message requests the NFVO to perform instantiation for the NS;
receiving, by the NM, an NS instantiation completion message from the NFVO, wherein the NS instantiation completion message indicates that instantiation for the NS is completed, and wherein the NS instantiation completion message comprises the information about the NS and identifiers of one or more virtualized network functions (VNFs) forming the NS; and determining, by the NM, a mapping relationship between the NS and the one or more VNFs according to the information about the NS and the identifiers of the one or more VNFs, wherein the instantiation information of the NS comprises an identifier of a VNF descriptor (VNFD) and an identifier of a deployment flavor of a VNF, wherein the information about the NS comprises instantiation information of the NS, and wherein determining the mapping relationship between the NS and the one or more VNFs comprises determining, by the NM, the mapping relationship between the NS and the one or more VNFs according to the instantiation information of the NS and the identifiers of the one or more VNFs.

2. The method of claim 1, wherein the identifier of the VNF is allocated to the VNF by a VNF manager (VNFM) coupled to the VNF.

3. The method of claim 1, wherein the information about the NS comprises instantiation information of the NS, and wherein determining the mapping relationship between the NS and the one or more VNFs comprises determining, by the NM, the mapping relationship between the NS and the one or more VNFs according to the instantiation information of the NS and the identifiers of the one or more VNFs.

4. The method of claim 1, wherein the information about the NS comprises an identifier of the NS.

5. The method of claim 1, wherein the information about the NS comprises instantiation information of the NS.

6. An apparatus, used for a network manager (NM), comprising:
  a transmitter configured to send a network service (NS) instantiation request message to a network function virtualization orchestrator (NFVO), wherein the NS instantiation request message comprises information about an NS, and wherein the NS instantiation request message requests the NFVO to perform instantiation for the NS;
  a receiver coupled to the transmitter and configured to receive an NS instantiation completion message from the NFVO, wherein the NS instantiation completion message indicates that instantiation for the NS is completed, and wherein the NS instantiation completion message comprises the information about the NS and identifiers of one or more virtualized network functions (VNFs) forming the NS; and
  a processor coupled to the transmitter and the receiver and configured to determine a mapping relationship between the NS and the one or more VNFs according to the information about the NS and the identifiers of the one or more VNFs received by the receiver, wherein the instantiation information of the NS comprises an identifier of a VNF descriptor (VNFD) and an identifier of a deployment flavor of a VNF, wherein the information about the NS comprises instantiation information of the NS, and wherein determining the mapping relationship between the NS and the one or more VNFs comprises determining, by the NM, the mapping relationship between the NS and the one or more VNFs according to the instantiation information of the NS and the identifiers of the one or more VNFs.

7. The apparatus of claim 6, wherein the identifier of the VNF received by the receiver is allocated to the VNF by a VNF manager (VNFM) coupled to the VNF.

8. The apparatus of claim 6, wherein the information about the NS received by the receiver comprises instantiation information of the NS, and wherein the processor is further configured to determine the mapping relationship between the NS and the one or more VNFs according to the instantiation information of the NS and the information about the one or more VNFs.

9. A non-transitory processor-readable medium having processor-executable instructions stored thereon for a network manager (NM), wherein the processor-executable instructions, when executed by a processor, cause the processor to be configured to perform a method comprising:
  sending a network service (NS) instantiation request message to a network function virtualization orchestrator (NFVO), wherein the NS instantiation request message comprises information about an NS, and wherein the NS instantiation request message requests the NFVO to perform instantiation for the NS;
  receiving an NS instantiation completion message from the NFVO, wherein the NS instantiation completion message indicates that instantiation for the NS is completed, and wherein the NS instantiation completion message comprises the information about the NS and identifiers of one or more virtualized network functions (VNFs) forming the NS; and
  determining a mapping relationship between the NS and the one or more VNFs according to the information about the NS and the identifiers of the one or more VNFs, wherein the instantiation information of the NS comprises an identifier of a VNF descriptor (VNFD) and an identifier of a deployment flavor of a VNF, wherein the information about the NS comprises instantiation information of the NS, and wherein determining the mapping relationship between the NS and the one or more VNFs comprises determining, by the NM, the mapping relationship between the NS and the one or more VNFs according to the instantiation information of the NS and the identifiers of the one or more VNFs.

10. The non-transitory processor-readable medium of claim 9, wherein the identifier of the VNF is allocated to the VNF by a VNF manager (VNFM) coupled to the VNF.

* * * * *

UNITED STATES PATENT AND TRADEMARK OFFICE
CERTIFICATE OF CORRECTION

PATENT NO. : 10,496,441 B2
APPLICATION NO. : 15/654286
DATED : December 3, 2019
INVENTOR(S) : Li Ji and Lan Zou Page 1 of 3

It is certified that error appears in the above-identified patent and that said Letters Patent is hereby corrected as shown below:

On the Title Page

Delete Title Page, replace with attached Title Page

In the Claims

Claim 1, Column 41, Lines 4-7: "more VNFs, wherein the instantiation information of the NS comprises an identifier of a VNF descriptor (VNFD) and an identifier of a deployment flavor of a VNF, wherein the information" should read "more VNFs, wherein the information"

Claim 1, Column 41, Line 8: "of the NS, and wherein determining" should read "of the NS, and the instantiation information of the NS comprises an identifier of a VNF descriptor (VNFD) and an identifier of a deployment flavor of a VNF, and wherein determining"

Delete Claim 3

Delete Claim 5

Claim 6, Columns 41 and 42, Lines 50-53 and 1-2: "receiver, wherein the instantiation information of the NS comprises an identifier of a VNF descriptor (VNFD) and an identifier of a deployment flavor of a VNF, wherein the information about the NS comprises instantiation information of the NS, and wherein" should read "receiver, wherein the information about the NS comprises instantiation information of the NS, and the instantiation information of the NS comprises an identifier of a VNF descriptor (VNFD) and an identifier of a deployment flavor of a VNF, and wherein"

Delete Claim 8

Claim 9, Column 42, Lines 39-49: "VNFs, wherein the instantiation information of the NS comprises an identifier of a VNF descriptor (VNFD) and an identifier of a deployment flavor of a VNF, wherein the information about the NS comprises instantiation information of the NS, and wherein determining Signed and Sealed this
Thirty-first Day of August, 2021

Drew Hirshfeld
*Performing the Functions and Duties of the
Under Secretary of Commerce for Intellectual Property and
Director of the United States Patent and Trademark Office* the mapping relationship between the NS and NM, the mapping relationship between the NS and the one or more VNFs according to the instantiation information of the NS and the identifiers of the one or more VNFs." should read "VNFs, wherein the information about the NS comprises instantiation information of the NS, and the instantiation information of the NS comprises an identifier of a VNF descriptor (VNFD) and an identifier of a deployment flavor of a VNF."

Renumber remaining claims sequentially as 1-7

CERTIFICATE OF CORRECTION (continued)

(12) United States Patent
Ji et al.

(10) Patent No.: US 10,496,441 B2
(45) Date of Patent: Dec. 3, 2019

(54) METHOD FOR ASSOCIATING NS WITH VNF, APPARATUS, AND SYSTEM

(71) Applicant: Huawei Technologies Co., Ltd., Shenzhen (CN)

(72) Inventors: Li Ji, Shanghai (CN); Lan Zou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 163 days.

(21) Appl. No.: 15/654,286

(22) Filed: Jul. 19, 2017

(65) Prior Publication Data
US 2017/0315844 A1    Nov. 2, 2017

Related U.S. Application Data

(63) Continuation of application No. PCT/CN2015/083809, filed on Jul. 10, 2015.

(30) Foreign Application Priority Data

Jan. 19, 2015   (WO) ............... PCT/CN2015/071007

(51) Int. Cl.
*G06F 9/46*       (2006.01)
*G06F 9/50*       (2006.01)
(Continued)

(52) U.S. Cl.
CPC ........ *G06F 9/5005* (2013.01); *G06F 9/45558* (2013.01); *G06F 9/50* (2013.01);
(Continued)

(58) Field of Classification Search
CPC ........ G06F 9/5005; G06F 9/4558; G06F 9/50; G06F 9/5077; G06F 2009/45595; H04L 29/02
See application file for complete search history.

(56) References Cited

U.S. PATENT DOCUMENTS 7,127,513 B2 * 10/2006 Karger ................ G06F 9/5027
                                                        709/226
9,760,428 B1 *  9/2017 Felstaine ............... H04L 41/022
(Continued)

FOREIGN PATENT DOCUMENTS

CN        104012066 A       8/2014
CN        104050045 A       9/2014
(Continued)

OTHER PUBLICATIONS

Machine Translation and Abstract of Chinese Publication No. CN104050045, Sep. 17, 2014, 29 pages.
(Continued)

*Primary Examiner* — Camquy Truong
(74) *Attorney, Agent, or Firm* — Conley Rose, P.C.

(57) ABSTRACT

A method for associating a network service (NS) with a virtualized network function (VNF), an apparatus, and a system such that a network manager (NM) can determine a relationship between an NS and a VNF, and maintain the NS. The method includes sending, by an NM, an NS instantiation request message to a network function virtualization orchestrator (NFVO), receiving an NS instantiation completion message from the NFVO, and determining a mapping relationship between a first NS and N VNFs according to information about the first NS and information about the N VNFs. The NS instantiation request message carries the information about the first NS, the NS instantiation completion message carries the information about the first NS and the information about the N VNFs, information about each VNF in the information about the N VNFs represents the VNF in the N VNFs forming the first NS, and N≥1.

7 Claims, 25 Drawing Sheets